United States Patent [19]

Keating

[11] Patent Number: 5,493,518

[45] Date of Patent: Feb. 20, 1996

[54] METHOD AND APPARATUS FOR SIMULATING COLORED MATERIAL

[75] Inventor: Michael P. Keating, Greensboro, N.C.

[73] Assignee: Cone Mills Corporation, Greensboro, N.C.

[21] Appl. No.: 227,642

[22] Filed: Apr. 14, 1994

[51] Int. Cl.$^6$ ..................................................... G01J 3/46
[52] U.S. Cl. ........................ 364/578; 364/526; 358/518
[58] Field of Search .................................. 364/578, 526; 356/402, 405, 406; 358/518, 520, 521, 523, 504, 505, 515

[56] References Cited

U.S. PATENT DOCUMENTS

| | | | |
|---|---|---|---|
| 4,349,279 | 9/1982 | Jung | 356/402 |
| 4,414,635 | 11/1993 | Gast et al. | 364/526 |
| 4,488,245 | 12/1984 | Dalke et al. | 364/526 |
| 4,500,919 | 2/1985 | Schreiber | 358/78 |
| 4,685,071 | 8/1987 | Lee | 364/526 |
| 4,745,555 | 5/1988 | Connelly et al. | 364/470 |
| 4,884,130 | 11/1989 | Huntsman | 358/80 |
| 4,884,221 | 11/1989 | Sugiyama et al. | 364/526 |
| 4,954,976 | 9/1990 | Noonan | 364/578 |
| 4,984,181 | 1/1991 | Kliman et al. | 364/518 |
| 5,058,040 | 10/1991 | Tajima | 364/521 |
| 5,130,935 | 7/1992 | Takiguchi | 364/526 |
| 5,136,519 | 8/1992 | Yonemitsu | 364/470 |
| 5,255,350 | 10/1993 | Hermann et al. | 395/109 |
| 5,270,808 | 12/1993 | Tanioka | 358/527 |
| 5,296,923 | 3/1994 | Hung | 358/527 |
| 5,317,425 | 5/1994 | Spence et al. | 358/504 |
| 5,335,187 | 8/1994 | Koizumi et al. | 364/526 |
| 5,377,041 | 12/1994 | Spaulding et al. | 358/518 |
| 5,428,720 | 6/1995 | Adams, Jr. | 395/131 |

OTHER PUBLICATIONS

"Spectrophotometric Color Formulation Of Off Standard Colorants: Formula Selection With Respecto to Match Sensitivity and the Optimization of Colorant Formulation with Respect to Colorant Availability" of Michael Keating, May 22, 1986.

Primary Examiner—Ellis B. Ramirez
Assistant Examiner—Patrick J. Assouad
Attorney, Agent, or Firm—Nixon & Vanderhye

[57] ABSTRACT

Method and apparatus are provided for generating a simulation of a colored material. In particular, the method and apparatus generate a simulation of a colored target material utilizing a "selected" point in color space and a character reference pattern. The selected point in color space can itself be determined according to novel aspects of the invention (e.g., color candidate representation points), or other inputted as a result of other processes (e.g., colorant formula performance analyses). In one mode of the invention, the selected point in color space can represent a color of a constituent element of the target material after the material has undergone one or more color-affecting treatments or processes. Advantageously, the present invention not only generates a simulation of a color material of a central color, but also generates simulations useful for representing color shade variations with respect to the central color. The method and apparatus are particularly suited for the simulation of colored fabric or textiles, such as denim, but are not limited thereto, having applicability to other colored materials as well.

78 Claims, 14 Drawing Sheets

CIELAB ALTERNATE SCALES [D65 -10]

| | | L* | a* | b* | Wcie | Ylastm | CVAL |
|---|---|---|---|---|---|---|---|
| TD.]-1 | | 26.00 | 0.36 | -6.22 | 78.31# | -28.02 | 0.7206 |
| q | | | | | | | |
| 1]-1 | | 26.00 | 0.36 | -6.22 | 78.31# | -28.02 | 0.7206 |
| 2]-2 | RIGID | 25.83 | 0.37 | -6.21 | 78.53# | -28.14 | 0.7305 |
| 3]-3 | | 26.63 | 0.30 | -6.10 | 76.10# | -27.00 | 0.6874 |
| 4]-1 | | 21.15 | 0.98 | -11.77 | 156.94# | -65.88 | 1.0327 |
| 5]-2 | RINSE | 22.00 | 0.84 | -11.76 | 153.93# | -64.12 | 0.9622 |
| 6]-3 | | 22.26 | 0.89 | -11.44 | 149.08# | -61.58 | 0.9412 |
| 7]-1 | | 27.57 | -1.09 | -15.03 | 173.27# | -72.86 | 0.6306 |
| 8]-2 | STONEWASH | 27.01 | -0.97 | -14.85 | 173.08# | -72.90 | 0.6578 |
| 9]-3 | | 27.65 | -1.01 | -14.72 | 169.62# | -70.89 | 0.6255 |
| 10]-1 | | 45.36 | -3.34 | -16.82 | 150.38# | -55.69 | 0.1832 |
| 11]-2 | I.Q. | 45.87 | -3.36 | -16.83 | 149.74# | -55.19 | 0.1770 |
| 12]-3 | | 45.60 | -3.25 | -16.35 | 146.36# | -53.65 | 0.1800 |
| 13]-1 | | 56.04 | -4.10 | -13.12 | 115.12# | -35.15 | 0.0902 |
| 14]-2 | N.A. | 56.72 | -4.22 | -13.06 | 114.62# | -34.63 | 0.0862 |
| 15]-3 | | 57.63 | -4.08 | -12.36 | 109.74# | -32.15 | 0.0810 |
| 16]-1 | | 68.45 | -3.60 | -6.93 | 79.89# | -14.96 | 0.0373 |
| 17]-2 | BLEACHOUT | 69.40 | -3.53 | -6.53 | 78.39# | -13.89 | 0.0347 |
| 18]-3 | | 69.32 | -3.49 | -6.60 | 78.73# | -14.07 | 0.0349 |

FIG. 7

METHOD AND APPARATUS FOR SIMULATING COLORED MATERIAL

BACKGROUND

1. Field of Invention

This invention pertains to method and apparatus for providing a predictive visible indication of ranges of shades for colored material, including ranges of shades within prescribed tolerances and ranges of shades statistically anticipated for a prescribed production specification.

2. Related Art and Other Considerations

The concept of color space is useful in representing and modeling color phenomena. Color space is a three-dimensional space in which each point corresponds to a color, including both luminance and chrominance aspects. The tristimulus values R (red), G (green), and B (blue) form such a color space. As used herein, color space has three axes— L*, (lightness); a* (red to green); and b* (blue to yellow). Tristimulus values are transformed (e.g., converted)into color space using, for example, the CIE 1976 L*a*b* equation. The CIE 1976 L*a*b* equation is explained in sundry prior publications including "CMC: Calculation of Small Color Differences For Acceptability", *AATCC Technical Manual*/1992, pp. 322–324.

In the production and/or use of colored materials, a color standard or specification is typically established for the material. It often occurs that the color standard can be achieved from a field of colorant formulations (e.g. a number of variations of colorant mixtures). Modern computer color formulation systems (including spectrophotometric instruments coupled with computers) have been used to find concentrations of a set of colorants which, when mixed together, achieve such color standards. These modern computer formulation systems typically use the well-known Kubelka-Munk mixing laws.

Realistically, colorants themselves (e.g., colorant concentrations) usually vary. Issues attending colorant variation are addressed in the; thesis "Spectrophotometric Color Formulation Of Off Standard Colorants: Formula Selection With Respect to Match Sensitivity And The Optimization of Colorant Formulation With Respect To Colorant Availability", of Michael Keating in 1986. The Keating thesis provides a model for optimizing an existing colorant formulation with respect to colorant availability and develops an index of "sensitivity", whereby a match of colorants can be chosen based on the relatively sensitivity of the match to changes in the concentrations of the colorants. The Keating thesis proposes an analytical method which determines parameters (e.g., shape, position, etc.) of an n-dimensional ellipse which describes sensitivity and optimized vectors of concentrations.

SheLyn Incorporated has developed a color control system which utilizes the Keating thesis. The SheLyn color control system predicts the performance (production pattern) of a given color formulation. As exemplified by FIG. 11, screen graphics and printed output of such a color control system provides a display of expected production variation of the formula against a CMC acceptability ellipsoid for that shade.

The Keating thesis and SheLyn color control system deal only with colorant formulation, other factors such as stability and fading characteristics explicitly being beyond the scope of the prior Keating research. Yet, in many industrial applications, subsequent treatment of colored materials affects not only lightness, but also produces a color shift. Often a series of treatment steps or operations are required in route to a finished material. Generally a color standard is established with respect to the finished product.

One non-limiting example of such subsequent treatment occurs in textile production, particularly the manufacture of denim. As is well known, denim is typically produced using a dyed warp yarn extending in a first direction, and an uncolored fill yarn which extends in a cross direction. Upon being woven with the warp yarn and fill yarn, the unwashed denim is called "rigid" denim. The denim is then subjected to one or more washing operations at a laundry. The number and nature of the washing operations is dependent upon the desired commercial characteristics of the denim. The washing operations can include (for example), in consecutive order, a rinse stage, a stonewash stage, an instant old stage, new age stage, and bleachout stage.

A denim consumer (e.g., a blue jean manufacturer) generally establishes a color standard for the consumer's product. For example, if a blue jean manufacturer produces a stonewash denim jean, the manufacturer will provide a color standard for the stonewash denim jean.

For quality control purposes, the color standard is typically in the form of a visual shade band or blanket. With respect to denim, the visual shade blanket is usually produced in a manner such as the following: the laundry washes, to the pre-selected stage (e.g., stonewash, instant old, etc.), between one thousand and five thousand garments, cut from three or more rolls of sample denim. From these garments the laundry cuts and submits to the denim customer a range of swatches of differing coloration. The customer chooses a center swatch representing the preferred or ideal coloration, as well as other tolerance swatches which illustrate acceptable extremes of coloration. In some cases the swatches may then be mounted (e.g., in juxtaposition) on a substrate to form a blanket.

After adoption of the color standard (e.g., production of the center and tolerance swatches), during denim production the color standard is used periodically for quality control at the laundry. For example, if, after reaching the desired washing stage at the laundry, a new batch of denim does not fit within the visual shade band represented by the blanket, the laundry must stop production and submit samples of the new batch to the denim consumer for approval. In view of such facts as variation between the shade range of production denim and the sample denim used for the shade blanket, as well as differences in concentration/formulation of dye for the warp yarn, the scenario of submission to the customer may repeat several times during the life of a product. Unfortunately, each such stoppage occasions delay, as well as increased inventory and downtime at the laundry.

The inefficiency of the current denim production/laundry quality control regime is exacerbated as customers demand not only higher quality denim, but denim of greater diversity (e.g., colorations diverse from conventional indigo, denim of differing character), all with shorter production lead times.

Lacking in the prior art, among other things, is a system which provides the colored material (e.g., denim) consumer with a visible indication or prediction for the potential of long term shade variation before the colored material goes into production.

Present techniques allow for color variation in order to achieve an image depicting physical characteristics or desired aesthetic modifications to a material design. For example, U.S. Pat. No. 4,500,919 to Schreiber (incorporated by reference) discloses a system in which a color original is generated by taking into consideration aesthetically desired alterations.

U.S. Pat. No. 4,954,976 to Noonan, entitled "Method For Simulating Dyed Fabric" (incorporated herein by reference), provides a simulated view (via color monitor or hardcopy) of dyed fabric. Noonan fails, among other things, to take into consideration variable shade ranges at differing stages of processing. Rather, Noonan uses color correction (e.g., shading) at edges of yarn shape to simulate the travel of yarn over and beneath other yarns. In particular, Noonan corrects colors of simulated yarn shape so that the average color is equal to the spectrophotometrically measured color of the actual yarn shape. Thus, Noonan provides no suggestion for providing simulation of shade ranges of fabric, much less shade ranges at varying stages of processing.

SUMMARY

Method and apparatus are provided for generating a simulation of a colored material. In particular, the method and apparatus generate a simulation of a colored target material utilizing a "selected" point in color space and a character reference pattern. The selected point in color space can itself be determined according to novel aspects of the invention as discussed below (e.g., color candidate representation points), or other input as a result of other processes (e.g., colorant formula performance analyses). In one mode of the invention, the selected point in color space can represent a color of a constituent element of the target material after the material has undergone one or more color-affecting treatments or processes. Advantageously, the present invention not only generates a simulation of a color material of a central color, but also generates simulations useful for representing color shade variations with respect to the central color. The method and apparatus are particularly suited for the simulation of colored fabric or textiles, such as denim, but are not limited thereto, having applicability to other colored materials as well.

In one mode of the invention, a calculation processor determines the "selected" point in color space corresponding to the desired color of the colored target material. In response to user or stored input in the form of shade variation tolerance (e.g., $DE_{CMC}$), an image processor determines a three dimensional volume (e.g., an ellipse) of acceptable color variation about the selected point, as well as a plurality of shade variation representation points. The shade variation points exist in color space on a surface of the three dimensional volume. The shade variation representation points together with the selected point form a set of color candidate representation points. The image processor drives an output device to generate a shade simulation output for each color candidate representation point, thereby forming a set of simulation outputs depicting a range of predetermined shade variations. The output device can be a printer or a display screen.

As indicated above, in generating the shade simulation output(s), the image processor takes into consideration not only the selected point in color space (e.g., the desired color), but also the character of the type of material being simulated. As used herein, the term "character" refers to one or more physical properties of constituent element(s) of the target material, including sizing and positional relationships of the constituent elements. For denim, for example, character refers to one or more of the following: size of warp yarn, size of fill yarn, tightness of weave, pattern [e.g., twill, right hand or left hand]). To obtain an indication of character, a character reference pattern is obtained either by analysis of a character reference material by a scanner, or by selection from a character reference pattern library stored in memory accessible to the image processor. The character reference pattern is stored in memory as an array, each of a plurality of elements corresponding to a sub-area of the simulation output (e.g., a pixel). Each element of the array is assigned a corresponding initial lightness value. Utilization of the character reference pattern, in conjunction with a particular one of the representation points in color space, can occur either in a linear or non-linear mode.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 7 is a table showing numerical values of spectral data for one type of swatch.

DETAILED DESCRIPTION OF THE DRAWINGS

Figure 1:
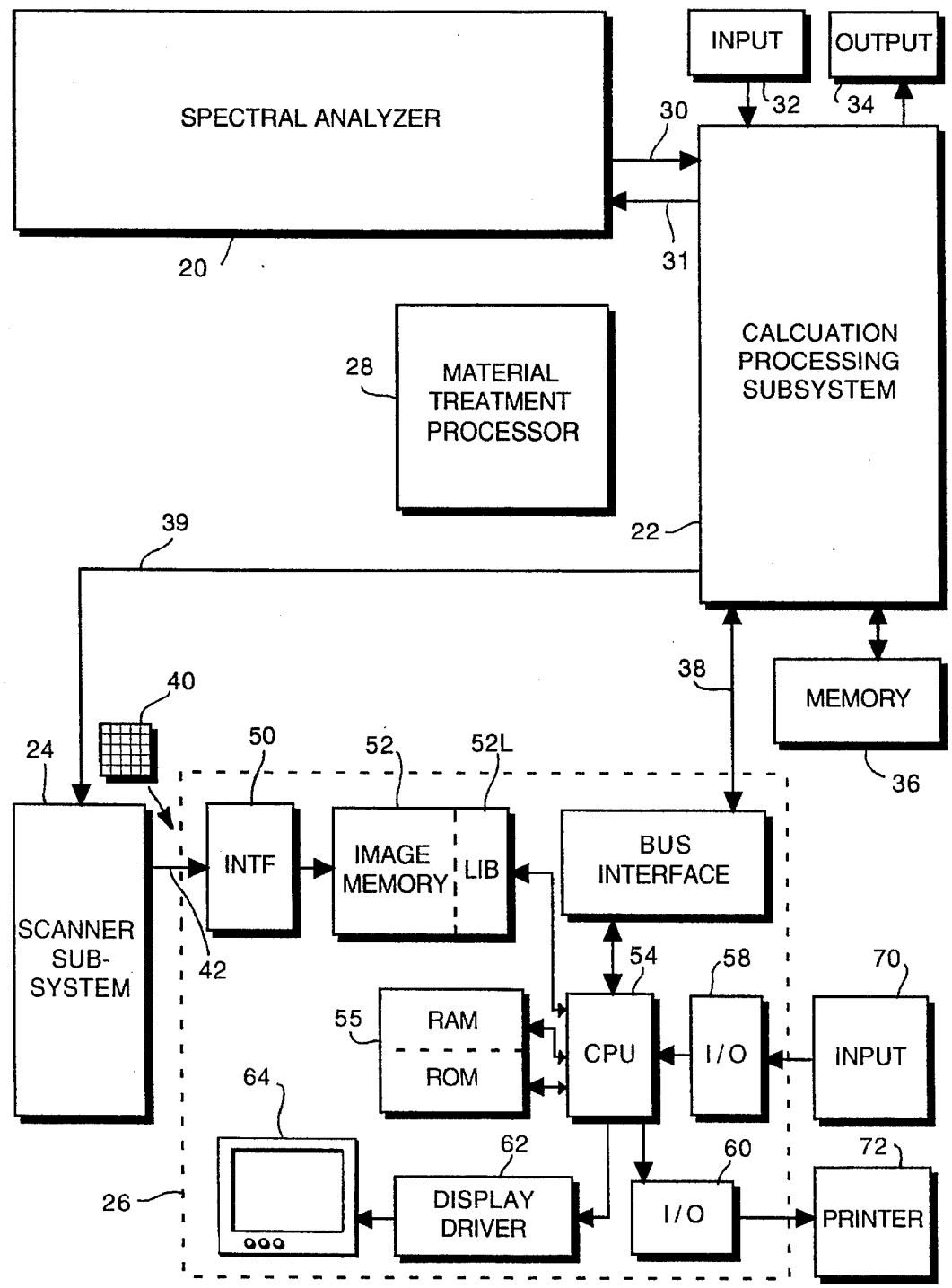
FIG. 1 is a schematic view of a shade simulation system according to an embodiment of the invention.

FIG. 1 shows a material simulation system which includes a spectral analyzer subsystem 20; a calculation processing subsystem 22; a scanner subsystem 24; and an image processor subsystem 26. In some modes, the material simulation system of FIG. 1 operates in conjunction with a material treatment processor 28.

Figure 2:
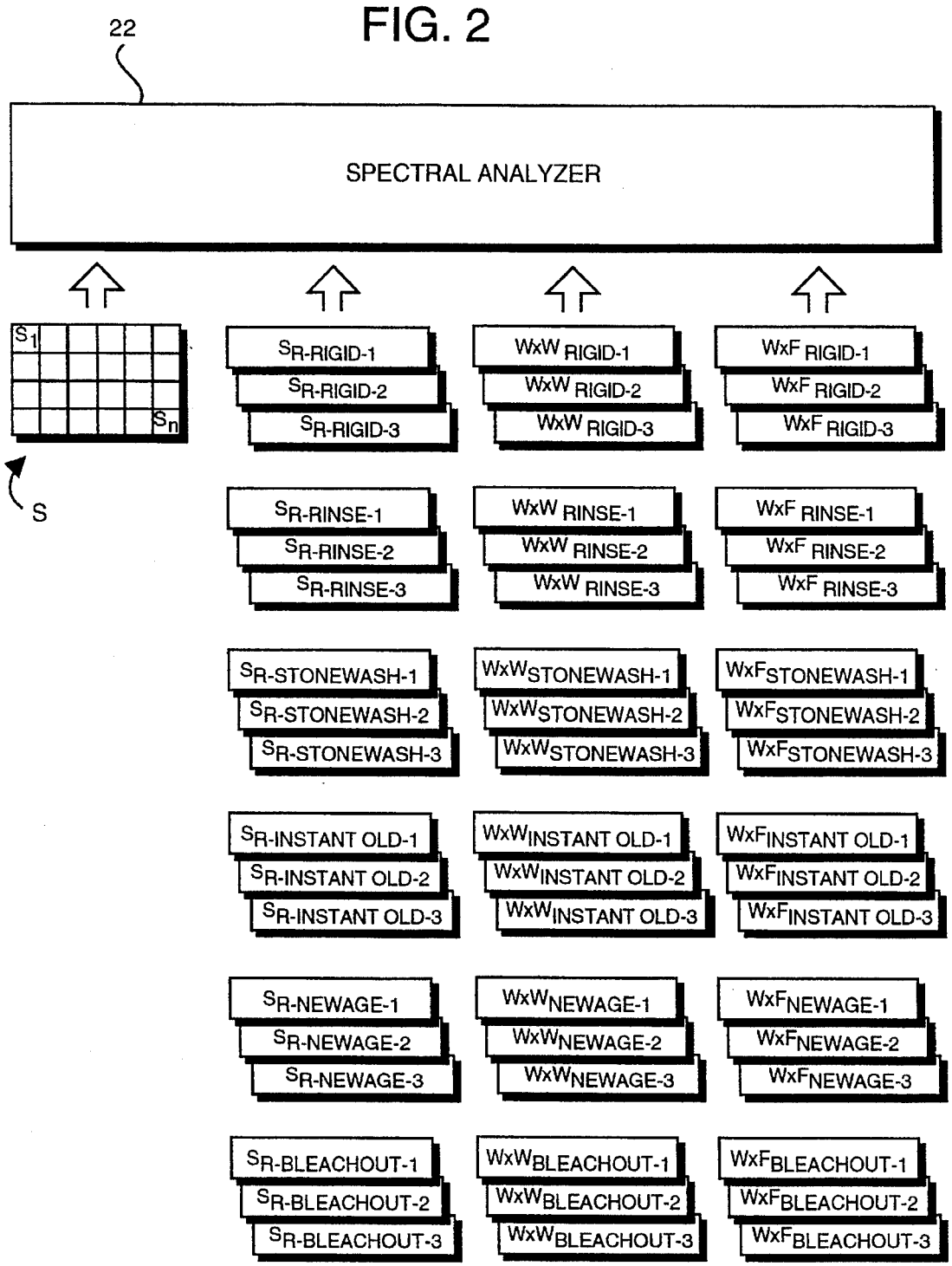
FIG. 2 is a schematic view depicting input of swatches into a spectral analyzer of the embodiment of FIG. 1.
Figure 4:
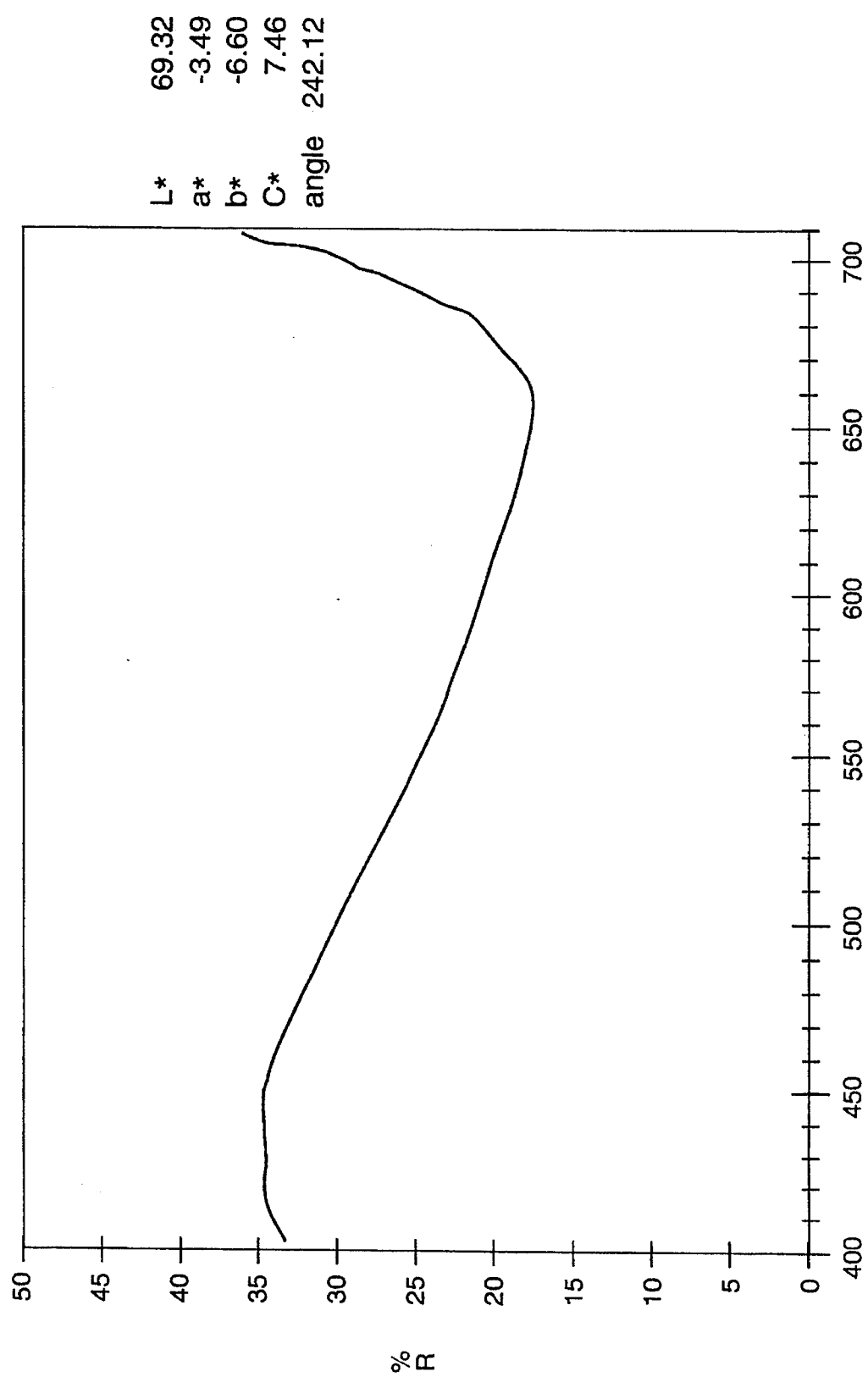
FIG. 4 is a graph showing spectral analysis information provided by a spectral analysis subsystem included in the embodiment of FIG. 1.

As subsequentially explained in more detail with reference to FIG. 2, spectral analyzer subsystem 20 (also known as analyzer 20) receives one or more colored materials for analysis and separately, for received each material, conducts a spectra analysis. Color material is, in the illustrated embodiment, typically received for analysis in the form of a swatch. As a result of the spectral analysis, for each received material, analyzer 20 generates data sufficient to generate the graph shown as FIG. 4. In particular, analyzer 20 provides a percent reflectance value (%R) for wavelengths in a range approximating the visible portion of the electromagnetic spectrum (e.g., from about 400 nm to about 720 nm). In addition, for each analyzed material, analyzer 20 provides values for $L^*$, $a^*$, $b^*$, and $C^*$, as well as an angle value $\theta$, which are collectively referred to as spectral data. As well understood by those skilled in the art, $L^*$, $a^*$, $b^*$ are CIELAB standard nomenclature as explained above. Regarding other nomenclature, $C^*$ refers to Chroma and angle $\theta$ refers to hue angle. In the illustrated embodiment, the spectral analyzer subsystem 20 is provided by Hunterlab and bears model number CQS-1600.

Arrow 30 in FIG. 1 represents input of spectral data from analyzer 20 to calculation processing subsystem 22. In one embodiment, input of spectral data from analyzer 20 to calculation processing subsystem 22 is by manual entry. In an automated embodiment, for each analyzed material, each of the values included in the spectral data are transmitted over suitable electrical cable(s) to calculation processing subsystem 22 in accordance with a predetermined protocol. For example, in response to a command signal from subsystem 22 carried on line 31, analyzer 20 conducts the analysis of a swatch of analyzed material received therein and transmits spectral data for the swatch to subsystem 22 as depicted by arrow 30.

Calculation processing subsystem 22 has connected thereto (via conventional interfaces) an input device 32, an output device 34, and memory 36. In the illustrated embodiment, input device 32 is a keyboard; output device 34 is a printer. As explained hereinafter, calculation processing subsystem 22 is a computer configured to control the sequence of operations of analyzer 20, image processor subsystem 26, and scanner 24, as well as to control transmission of data between itself, analyzer 20, and image processor subsystem 26. Bus 38 carries signals and data between calculation processing subsystem 22 and scanner subsystem 24 (also abbreviated herein as "scanner"). Line 39 is employed in the illustrated embodiment to control scanner 24. Calculation processing subsystem 22 also makes certain calculations as hereinafter described.

As explained in more detail below, scanner subsystem 24 receives a character reference swatch and, upon either manual or automated command (from subsystem 22 on line 39), generates a two-dimensional color image or color map of the scanned character reference swatch. The color map is used as a color reference pattern. That is, scanner subsystem 24 assigns color value(s) for each of a plurality of two-dimensional sub-areas or elements of the character reference swatch, thereby generating an array 40 which is a color mapping of the character reference material. In the illustrated embodiment, scanner 24 is of a type such as that commercially available from Sharp Corporation as model JX-450. As explained below, array 40 comprises a plurality of elements 41 (corresponding to the two-dimensional sub-areas), with each element 41 of array having a potential plurality of values assigned thereto.

Arrow 42 represents input of array 40 to image processor subsystem 26, and in particular through an input interface 50 to image memory 52 of image processor subsystem 26 (often abbreviated herein as "image processor"). As shown in FIG. 1, image processor 26 further comprises a CPU 54; memory 55; an input interface 58; a bus interface 59; a printer interface 60; a display driver 62; and, a display screen 64. Memory 55 includes both a ROM portion (for storing, e.g., executable instructions) and a RAM portion. An input device 70 (e.g., keyboard optionally provided with mouse, etc.)is connected to image processor subsystem 26 through interface 58. Image processor subsystem 26 is connected through interface 60 to a printer 72. In the illustrated embodiment, image processor subsystem 26 is a textile design-type CADCAM system such as that commercially available from Sophis System. Printer 72 is preferably a four ink-jet type printer such an Iris model 3024 or 4012.

Figure 3:
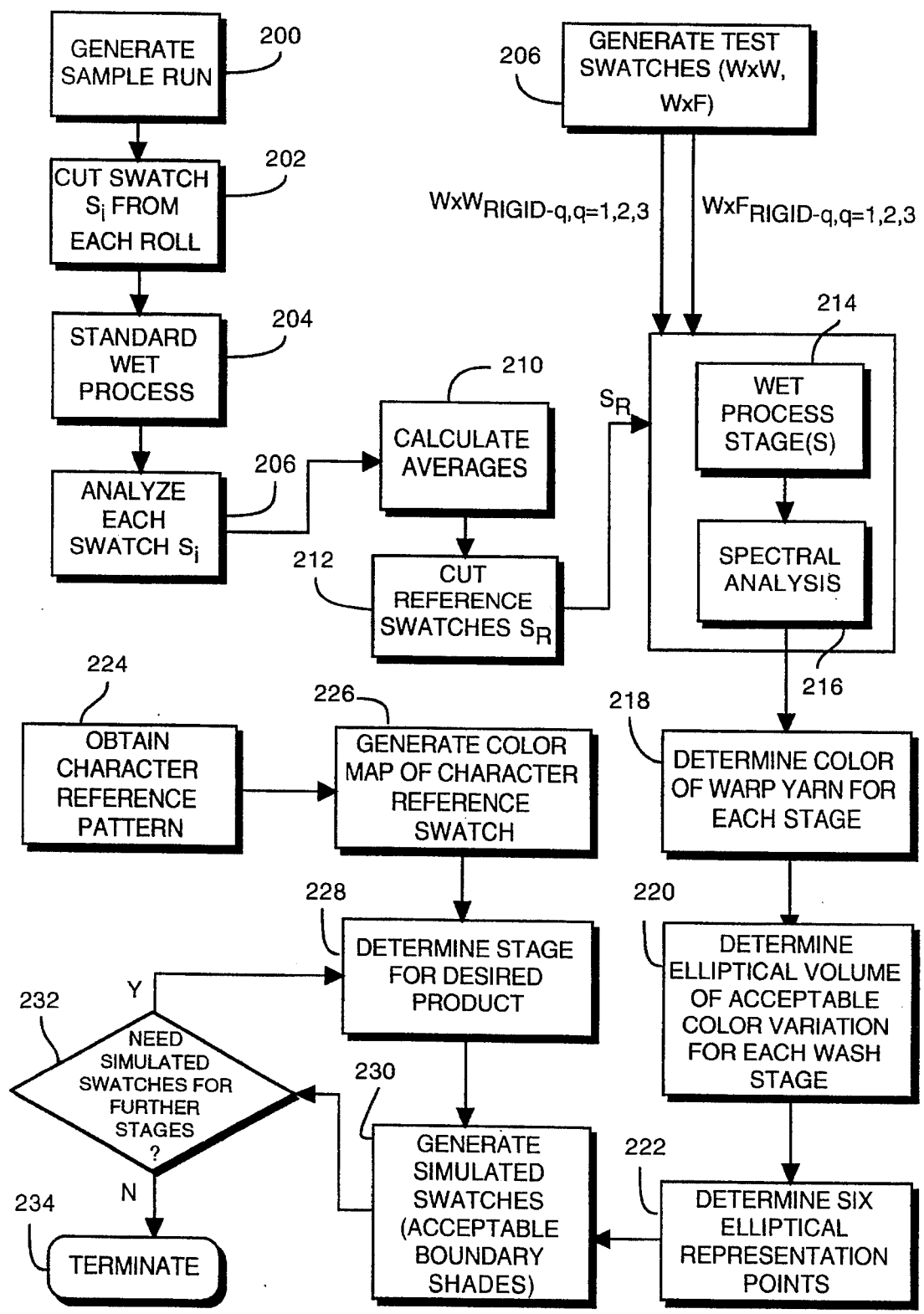
FIG. 3 is a flowchart showing general steps executed in connection with a material simulation process utilizing at least one color candidate representation point.
Figure 3A:
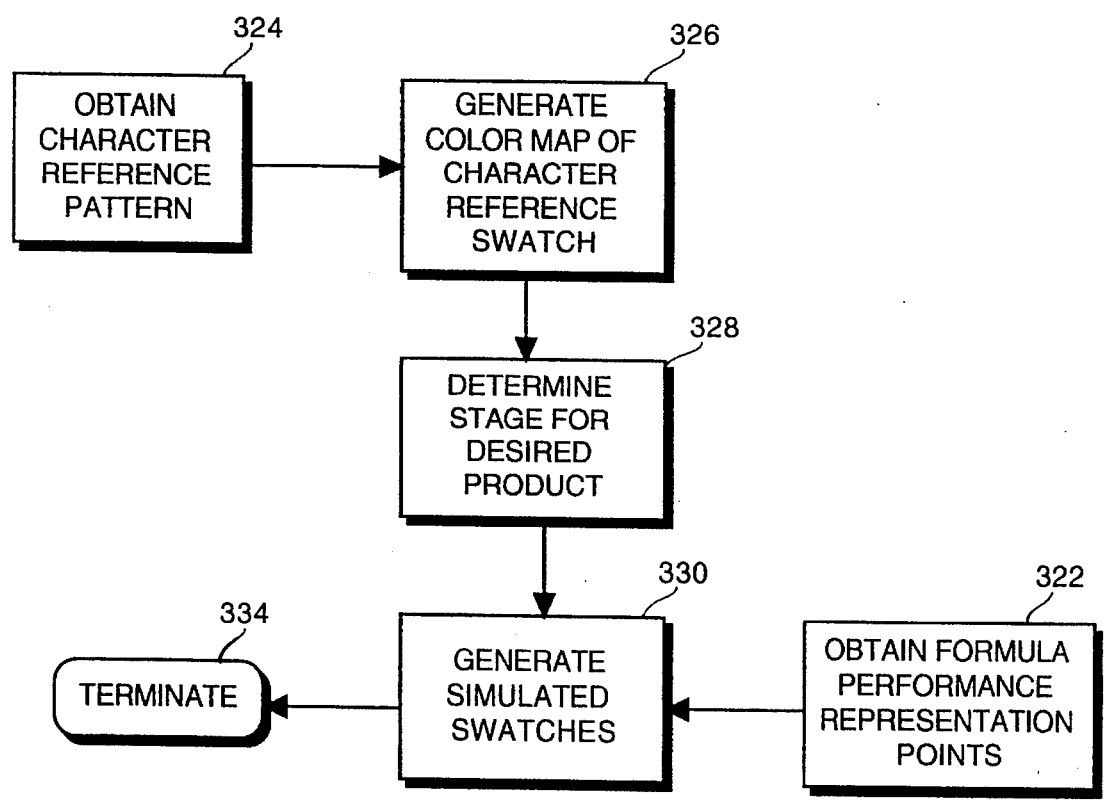
FIG. 3A is a flowchart showing general steps executed in connection with a material simulation process utilizing at least one formula performance representation point.

FIG. 3 shows steps executed by shade range simulation system 20 in connection with generation of a shade range simulation according to a mode of the invention. Step 200 represents a sample manufacturing run of textile material which, in the illustrated embodiment, is denim. While denim provides the example for illustration for the present invention, it should be understood that other materials can be processed and simulated according to Step 200 of FIG. 3 typically involves production of 3,000 to 5,000 yards of denim, or possibly as much as 20,000 yards of denim (in the case of a fully dye run). The denim production of step 200 results in a plurality of rolls of raw denim. At step 202, a swatch is cut from each raw roll, resulting in a plurality of swatches $S_1$–$S_n$. At step 204, a standard wet process is conducted for each of the plurality of swatches $S_1$–$S_n$.

At a random point in the production of denim occurring at step 200, the yarn used at the random point is also utilized to produce two types of special test swatches. The test swatches of the first type, known as the W×W test swatches, are produced by using the random warp yarn as both the warp yarn and the fill yarn. The test swatches of the second type, known as the W×F test swatches, are produced by using the random warp yarn as the warp yarn for the W×F test swatches and the random fill yarn as the fill yarn for the W×F test swatches.

Generation of the W×W and W×F test swatches is depicted by step 206 in FIG. 3. In the illustrated embodiment, a plurality of W×W and W×F test swatches are generated at step 206, with each test swatch originally being denoted as W×W$_{rigid-q}$ or W×F$_{rigid-q}$ as appropriate. Since the test swatches are subsequentially subjected to various stages of processing, a test swatches is more generically identified as a test swatch W×W$_{s-q}$ or $_{W \times Fs-q}$ (depending on type), wherein the subscript "s" represents a wash stage and the subscript "q" represents the swatch number. "Rigid" is a subscript which refers to a pre-wash stage of raw cut denim as obtained at step 206. The subscript "q" identifies a selected one of the plurality of test swatches. For example, in the illustrated embodiment, at step 206 three of each type of test swatches are generated: W×W$_{rigid-1}$, W×W$_{rigid-2}$, and W×W$_{rigid-3}$; as well as W×F$_{rigid-1}$, W×F$_{rigid-2}$, and W×F$_{rigid-3}$. Each of these test swatches is subsequently subjected to one or more treatment stages as described below.

At step 206, swatches $S_1$–$S_n$ (collectively depicted as "S" in FIG. 2), after being washed at step 204, are each separately analyzed in analyzer 20. Analyzer 20 determines spectral data for each swatch $S_i$, i= 1 , . . . n, which is then entered into calculation processing subsystem 22 as represented by arrow 30 in FIG. 1. When spectral data for all swatches have been entered into calculation subsystem 22, at step 210 subsystem 22 averages the spectral data and, based on the spectral data, determines which of the swatches $S_i$ mostly closely corresponds to the averaged spectral data. At step 212, a plurality (e.g., three) of "center" or "color reference" swatches $S_{R\text{-}rigid\text{-}q}$ of rigid denim are then cut from the same raw roll of denim that produced the swatch which mostly closely corresponded to the averaged spectral data obtained in step 210. Using this notation, the subscript "R" denotes a color reference swatch, the subscript "q" again is used to number the reference swatches. In the illustrated embodiment, q ranges from 1 to 3.

The color reference swatches $S_{R\text{-}rigid\text{-}q}$ are subsequently processed in laundry or material treatment processor 28, along with the test swatches $W \times W_{rigid\text{-}q}$ and the test swatches $W \times F_{rigid\text{-}q}$, through one or more color-affecting treatment stages in the manner hereinafter described. The reference swatches $S_{R\text{-}rigid\text{-}q}$ and all test swatches $W \times W_{s\text{-}rigid\text{-}q}$ and $W \times F_{s\text{-}rigid\text{-}q}$ are repeatedly subjected to a pair of sequential steps 214 and 216 (as illustrated in FIG. 2), The number of repetitions of applications of the treatment depends on the desired treatment stage for the finished product.

Step 214 involves a color-affecting process which is followed by a spectral analysis at step 216. The color-affecting process for the illustrated example (denim)is wet processing (e.g., washing) of the swatches, For example, upon first execution, step 214 constitutes a rinse stage for each of the swatches $S_R$, $W \times W$, and $W \times F$. For convenience, after the rinse stage the swatches are referred to as $S_{R\text{-}rinse\text{-}q}$, $W \times W_{rinse\text{-}q}$, $W \times F_{rinse\text{-}q}$. After the rinse of step 214, at step 216 the swatches $S_{R\text{-}rinse\text{-}q}$, $W \times W_{rinse\text{-}q}$, $W \times F_{rinse\text{-}q}$ are each separately input into analyzer 20. Analyzer 20 generates spectral data (i.e., "primaries") for each swatch $S_{R\text{-}rinse\text{-}q}$, $W \times W_{rinse\text{-}q}$, $W \times F_{rinse\text{-}q}$, which spectral data is inputted to the calculation processing subsystem 22.

The first execution of steps 214 and 216 can be followed by one or more paired executions of steps 214 and 216 for a second stage wash (stonewash), followed by a third stage wash (instant old wash), a fourth stage wash (new age wash), and a fifth stage wash (bleach out wash). The number of repetitions of paired steps 214 and 216 is dependent on the desired wash stage of the resultant product. Thus, spectral data ("primaries") are generated for each swatch as indicated by the Table 1 (and illustrated in FIG. 2). Table 1 and FIG. 2 also show the names acquired for each of the swatches upon completion of respective wash stages.

TABLE 1

| wash stage (s) ↓ | reference watch name | W × W test watch name | W × F test watch name |
|---|---|---|---|
| rigid | $S_{R\text{-}rigid\text{-}q}$ | $W \times W_{rigid\text{-}q}$ | $W \times F_{rigid\text{-}q}$ |
| rinse | $S_{R\text{-}rinse\text{-}q}$ | $W \times W_{rinse\text{-}q}$ | $W \times F_{rinse\text{-}q}$ |
| stonewash | $S_{R\text{-}stonewash\text{-}q}$ | $W \times W_{stonewash\text{-}q}$ | $W \times F_{stonewash\text{-}q}$ |
| instant old wash | $S_{R\text{-}instant\ old\text{-}q}$ | $W \times W_{instant\ old\text{-}q}$ | $W \times F_{instant\ old\text{-}q}$ |
| new age wash | $S_{R\text{-}new\ age\text{-}q}$ | $W \times W_{new\ age\text{-}q}$ | $W \times F_{new\ age\text{-}q}$ |
| bleach out wash | $S_{R\text{-}bleachout\text{-}q}$ | $W \times W_{bleachout\text{-}q}$ | $W \times F_{bleachout\text{-}q}$ |

At step 218, the calculation processing subsystem 22 mathematically determines, for each selected wash stage, the averaged color of the warp yarn for the reference color swatches $S_{R\text{-}s\text{-}q}$ of the selected wash stage. That is, for each wash stage, subsystem 22 determines a point in color space for the warp yarn for an average of the reference color watches $S_{R\text{-}s\text{-}q}$ at the end of the particular wash stage.

As a result of step 218, for each wash stage the color for the warp yarn is determined at a central color candidate representation point $P_{s\text{-}0}$ in $L^*, a^*, b^*$ color space. See, for example, the color space illustration of FIG. 6. As used herein, the subscript "s" for point $P_{s\text{-}0}$ refers to washing stage (in the manner aforedescribed) and the subscript "0" distinguishes the centrally determined point from six other representation points (also known as elliptical or shade variation representation points) described below.

In the above regard, in connection with step 218, it should be kept in mind that each reference swatch $S_{R\text{-}s\text{-}q}$ is comprised of both warp yarn and fill yarn, with the non-colored fill yarn having an effect on the appearance of the generally dyed warp yarn. While it is perhaps possible that the reference color swatches could be dissected to extract the warp yarn in a manner suitable for spectral analysis, the mathematical processing of the invention is more advantageous.

The determination of step 218 is accomplished by performing a spectral correction using data gleaned from the afore-described steps. The graphs of FIG. 5A and FIG. 5B, together with the table of FIG. 7, represent the data utilized for the determination (at step 218) of the location of point $P_{s\text{-}0}$.

Figure 5A:
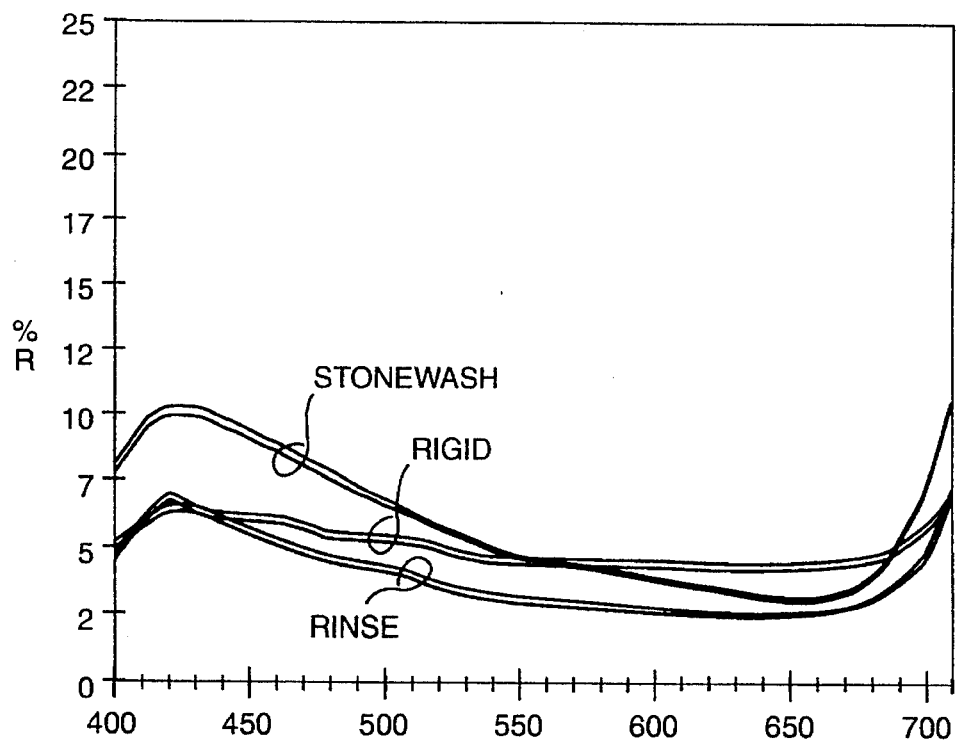
FIG. 5A and 5B are graphs showing spectral analysis information for various washing stages of a swatch of fabric.
Figure 5B:
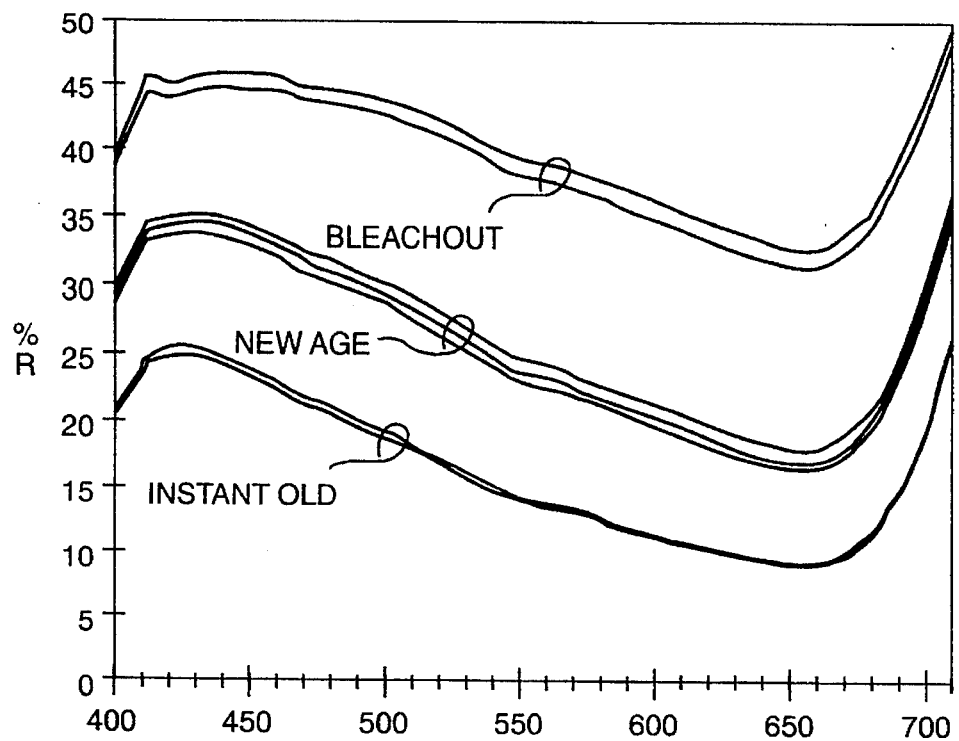

The graphs of FIG. 5A and FIG. 5B show spectral data for one type of three swatches for each of the washing stages. FIG. 5A and FIG. 5B collectively happen to illustrate superimposed spectral data curves for the various wash stages for test swatches $W \times F_{s\text{-}q}$ (the rigid and rinse stage curves being shown in FIG. 5A; the instant old, new age, and bleachout stages being shown in FIG. 5B). Although not necessarily visibly distinguishable for all stages, for each stage three curves are provided (one for each "q", q=1,2,3). Although illustrated only with respect to test swatches $W \times F_{s\text{-}q}$, it should be understood that similar spectral data curves and associated spectral data is also provided for reference swatches $S_{R\text{-}s\text{-}q}$ and test swatches $W \times W_{s\text{-}q}$.

FIG. 7 is a table showing numerical values of spectral data for one type of swatches (in particular for test swatches $W \times F_{s\text{-}q}$). Values are shown for each swatch (q=1,2,3) and for each stage. It should be understood that a comparable table of data is provided for reference swatches $S_{R\text{-}s\text{-}q}$ and test swatches $W \times W_{s\text{-}q}$. Spectral data included in such tables are calculated as necessary by calculating processing subsystem 22 and stored in memory 36.

The spectral data thus provides the calculating processing subsystem 22 with three sets of data—the set of data "TEST DATA$_{W \times F}$" illustrated in FIG. 7 for test swatches $W \times F_{s\text{-}q}$, a corresponding unillustrated set of data "REF SWATCH DATA$_{W \times F}$" for reference swatches $S_{R\text{-}s\text{-}q}$, and a corresponding unillustrated set of data "TEST DATA$_{W \times W}$" for test swatches $W \times W_{s\text{-}q}$. In connection with the foregoing representation of REF SWATCH DATA$_{W \times F}$), it should be recalled that the reference swatches (unlike the special test swatches $W \times W$) are prepared using both warp and fill yarn, making the subscript "W × F" appropriate.

Calculating processing subsystem 22 then averages the three values (q=1,2,3) for each stage for each type of swatch. So averaged, the three above-described data sets are transformed as follows:

TEST DATA$_{W \times F}$ → AVG TEST DATA$_{W \times F}$

TEST DATA$_{W \times W}$ → AVG TEST DATA$_{W \times W}$

REF SWATCH DATA$_{W \times F}$ → AVG REF SWATCH DATA$_{W \times F}$

Using these above-transformed sets of average data, a further set of averaged data (AVG REF SWATCH DATA$_{W \times W}$) can be mathematically obtained using conventional spread sheet and/or curve fitting programs. Each element of data set AVG REF SWATCH DATA$_{W \times W}$ corresponds to spectral data for the warp yarn required to produce the desired average reference swatch $\bar{S}_{R-s}$ at the corresponding stage of washing. For example, a first element of set AVG REF SWATCH DATA$_{W \times W}$ includes spectral data for generating the point $P_{rigid-0}$ (i.e., swatch $\bar{S}_{R-rigid}$); a second element of set AVG REF SWATCH DATA$_{W \times W}$(i.e., swatch $\bar{S}_{R-rinse}$); for generating the point $P_{rinse-0}$; and so forth.

Thus, the determination of the color for the desired warp yarn for each stage "s" is precisely determined as point $P_{s-0}$ in L*,a*,b* color space (step 218). Thereafter, a three-dimensional (elliptical)volume of acceptable color variation is determined at step 220 for a selected one of the points $P_{s-0}$ (e.g., either point $P_{rinse-0}$, $P_{stonewash-0}$, etc.). In particular, at step 220, calculating processing subsystem 22 obtains (e.g., from memory 36) a value indicative of what degree of color variation from the point $P_{s-0}$ is acceptable. This acceptable color variation value can be prestored (e.g., in RAM portion of memory 55) or prompted and entered (for example) using input device 32.

The elliptical volume at step 220 is essentially a determination of DEcmc (using the spectral data for generating point $P_{s-0}$) according to conventional practice. In this regard, see "CMC: Calculation of Small Color Differences For Acceptability", AATCC Technical Manual/1992, pp. 322–324.

Figure 6:
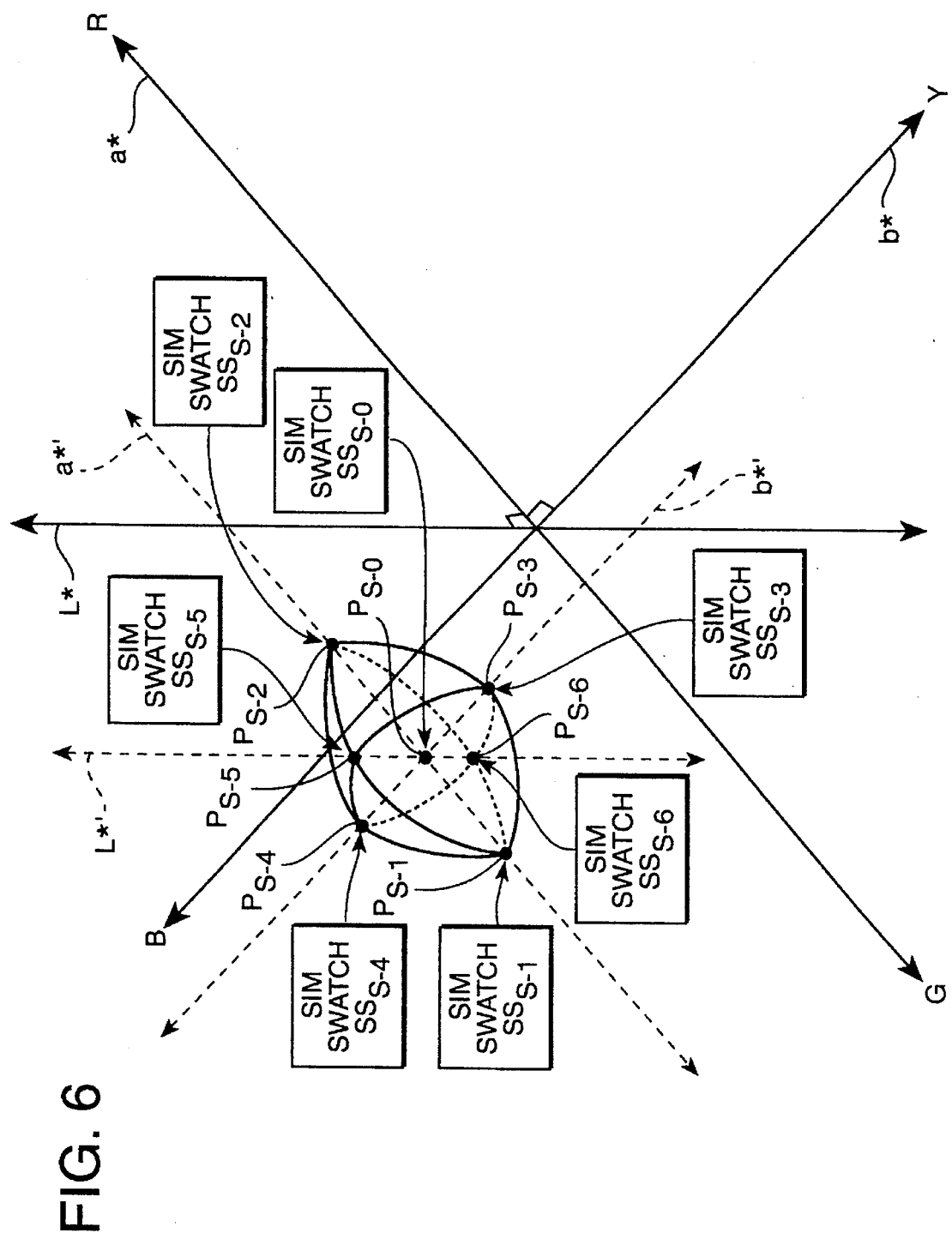
FIG. 6 is a graph illustrating representation points in $L^*,a^*,b^*$ color space.

At step 222, calculation subsystem 22 determines six additional points in L*,a*,b* color space. These six additional points, together with the point $P_{s-0}$, constitute a set of points hereinafter referenced as color candidate representation points. The points $P_{s-0}$ are referred to as central color candidate representation points. A subset of color candidate representation points comprising the six additional points are collectively referred to as shade variation representation points. In particular, these additional shade variation representation points are chosen (as illustrated in FIG. 6) at points on a surface of the elliptical volume (determined at step 220) intersects each of secondary axes L*',a*',b*' of the color space. The secondary axes L*',a*',b*' are centered about point $P_{s-0}$ and parallel to corresponding axes L*,a*,b* as shown in FIG. 6. The points at which the elliptical volume intersects the a*' axis of the color space are represented as $P_{s-1}$ and $P_{s-2}$; the points at which the elliptical volume intersects the b*' axis of the color space are represented as $P_{s-3}$ and $P_{s-4}$; the points at which the elliptical volume, intersects the L*' axis of the color space are represented as $P_{s-5}$ and $P_{s-6}$. Given the foregoing explanation (wherein subscript "s" is understood to refer to the selected wash stage), a representation point is generically referenced as $P_{s-p}$, wherein p=0, 1, 2, ... 6.

At step 224, a character reference pattern is obtained. In the illustrated embodiment, the character reference pattern can be obtained in two ways. As a first way of executing step 224, a swatch possessing the selected character of the target denim is scanned by scanner subsystem 24. The swatch scanned at step 224, identified herein as the character reference swatch $S_{CR}$ (as opposed to the color reference swatches $S_R$ described above), has preferably been treated (e.g., washed) to the same stage as the target material product being simulated. In an automated systems such as illustrated in FIG. 1, the scanning of step 224 is conducted in response to a scan command (carried via line 39) from the calculation processing subsystem 24.

As a second way of executing step 224, rather than requiring a physical scan of a character reference swatch, the operator can select (e.g., using input device 70) which of a pre-stored plurality of arrays 40 (each corresponding to character reference pattern) is desired for the target material-to-be-simulated. Thus, if desired, scanning sub-system 24 can be eliminated or employed only selectively if the operator builds a library 52L of character reference swatches in image memory 52.

As employed herein, the term "character" refers to one or more of non-color properties of the element(s), or structural relationship of elements, of which the target material is comprised. For denim, for example, character refers to one or more of the following: size of yarn, tightness of weave, pattern [e.g., twill, right hand or left hand]).

In an embodiment using scanner 24, the scanner generates a two-dimensional color image or color map of the scanned character reference swatch $S_{CR}$. That is, color values are assigned to each of a plurality of two-dimensional sub-areas of the character reference swatch $C_{CR}$, thereby generating a color array 40 for swatch $S_{CR}$. Thus, as a result of the scan at step 224, each two-dimensional sub-area of the scanned image array is assigned shade values (i.e., an R,G,B values), of which there could be as many as one thousand shade values. Each two-dimensional sub-area is referenced herein as an element and preferably ultimately corresponds to a pixel of display screen 64. Color array 40 is stored in image memory 52 of image processing subsystem 26.

At step 228, CPU 54 of the image processing subsystem 26 determines at what stage of washing the target material is to be simulated. Accordingly, at least by the time of execution of step 228, the image processing subsystem 26 must be apprised as to which particular stage of washing (e.g., stonewash, ancient old, etc,)is to be simulated. Such indication of washing stage can be input through input device 70 (in response, for example, to a prompt and stored in the RAM portion of memory 55).

At step 230 image processing subsystem 26 generates a plurality of swatch images $SS_{s-p}$ (e.g., simulated swatches) which represent acceptable boundary shades for the target denim product. As diagrammatically illustrated in FIG. 6, each simulated swatch $SS_{s-p}$ corresponds to one of the color candidate representation points $P_{s-p}$ (determined at step 222), but is corrected in view of the physical attributes of the character reference swatch $S_{CR}$.

Figure 8:
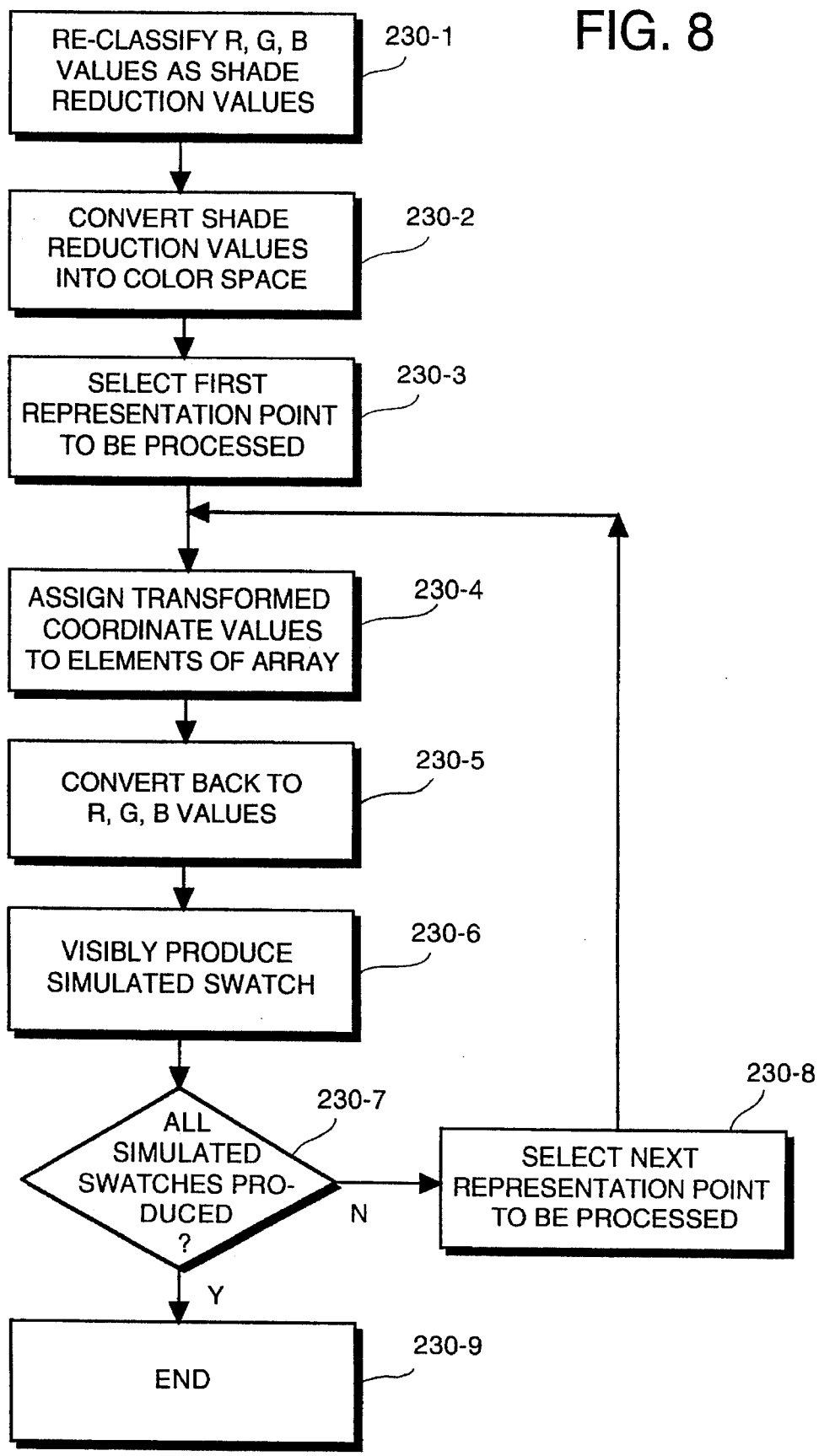
FIG. 8 is a flowchart showing steps included in the execution of swatch simulation generation.
Figure 10A:
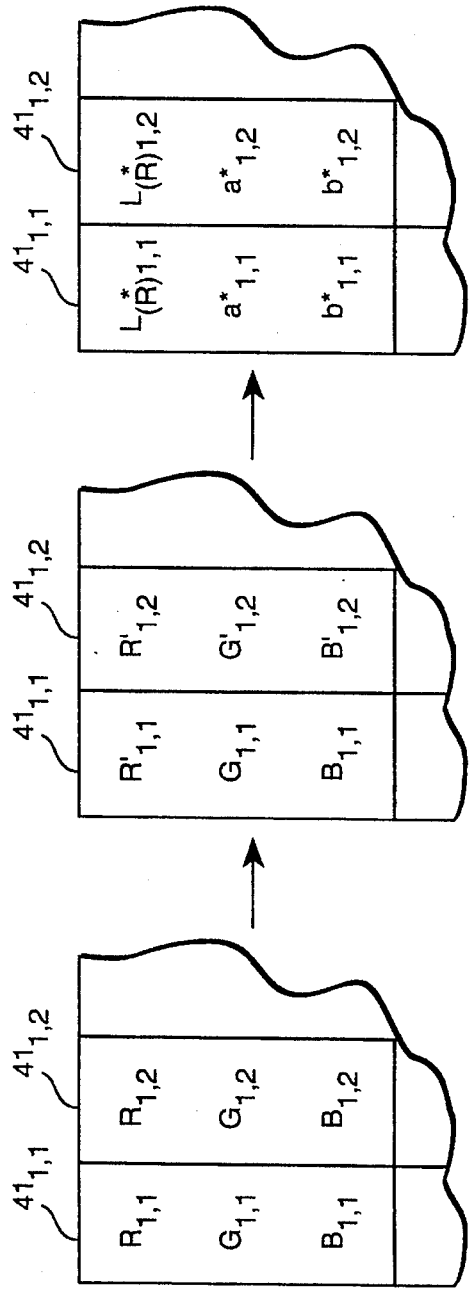
FIG. 10A–FIG. 10E are diagrammatic views showing values assigned during differing steps of processing to elements of an array used to prepare a simulation of a colored target material.

Sub-steps involved in the execution of swatch simulation step 230 are illustrated in FIG. 8. FIGS. 10A–10E illustrate processing of array 40 in the course of performing step 230. FIG. 10A shows the status of a portion of array 40 immediately following generation of array 40 at step 226, in particular array elements $41_{1,1}$ and $41_{1,2}$ and the R,G,B values assigned to each element $41_{1,1}$ and $41_{1,2}$.

Figure 10B:
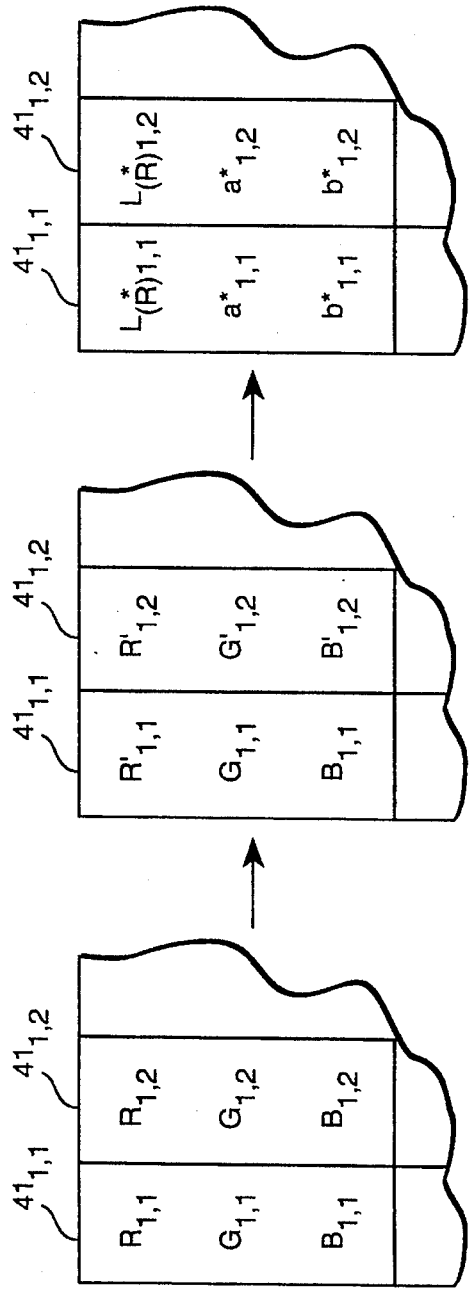

At sub-step 230-1 (see FIG. 8), the R,G,B shade values obtained in step 226 are reclassified as one of a predetermined number of "reduced shades" by conventional color reduction techniques. In the illustrated embodiment, by way of non-limiting example, nine reduced shades are utilized, so that each display element of the scanned image array is associated with one of the nine reduced shades. Thus, as a result of the shade reduction at step 230-1, elements $41_{1,1}$ and $41_{1,2}$ of array 40 have reduced R,G,B values (indicated by R',G',B') as seen in FIG. 10B.

Figure 9:
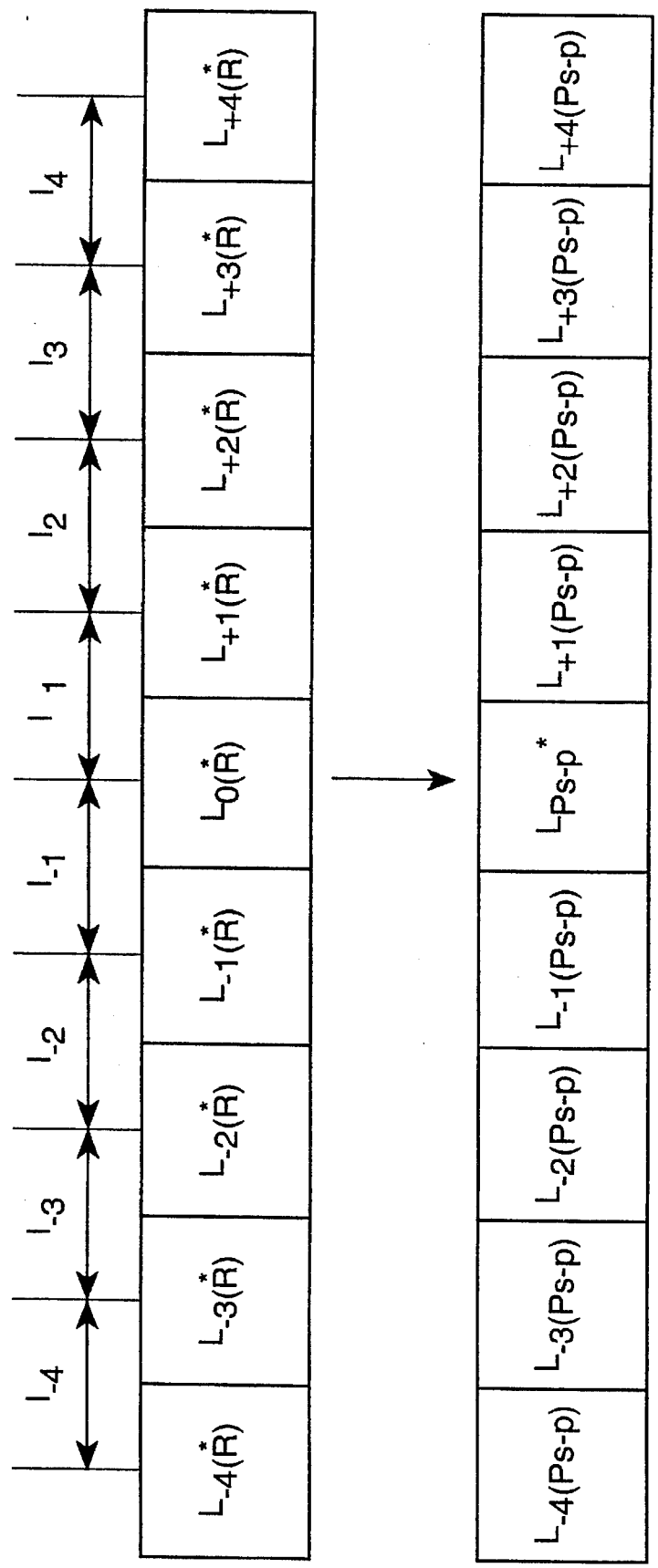
FIG. 9 is a diagrammatic view depicting re-justification of lightness coordinates of reduction shades about a lightness coordinate of a representation point according to a linear mode.

At sub-step 230-2, these nine reduced shade values are converted into color space (i.e., L*,a*,b* values) using conventional conversion techniques. Of these converted values, only the lightness (L*) value is utilized. Thus, remaining after sub-step 230-2 are nine L* reduced (subscript "R")values $L_{-4(R)}{}^*, L_{-3(R)}{}^*, \ldots L_{-1(R)}{}^*, L_{0(R)}{}^*, L_{+1(R)}{}^*, \ldots L_{+4(R)}{}^*$ which constitute a range $R_{L*}$, of lightness values centered about median value $L_{0(R)}{}^*$ and separated by intervals $I_V$ as shown in FIG. 9, the subscript V values running from −4 to +4. These nine L* reduced values are generically represented as $L^*_{(R)}$ (followed by appropriate element subscript)in FIG. 10C.

At sub-step 230-3, image processing subsystem 26 determines which swatch image $SS_{s-p}$ is first to be generated (i.e., which representation point $P_{s-p}$ is first to be processed). In the illustrated embodiment, representation point $P_{s-0}$ is first selected, so that swatch image $SS_{s-0}$ will be generated first. In connection with the selection of points in connection with sub-step 230-3 and the ensuing sub-steps, it should be recalled that the stage "s" was previously selected (see the description of step 228).

Figure 10C:
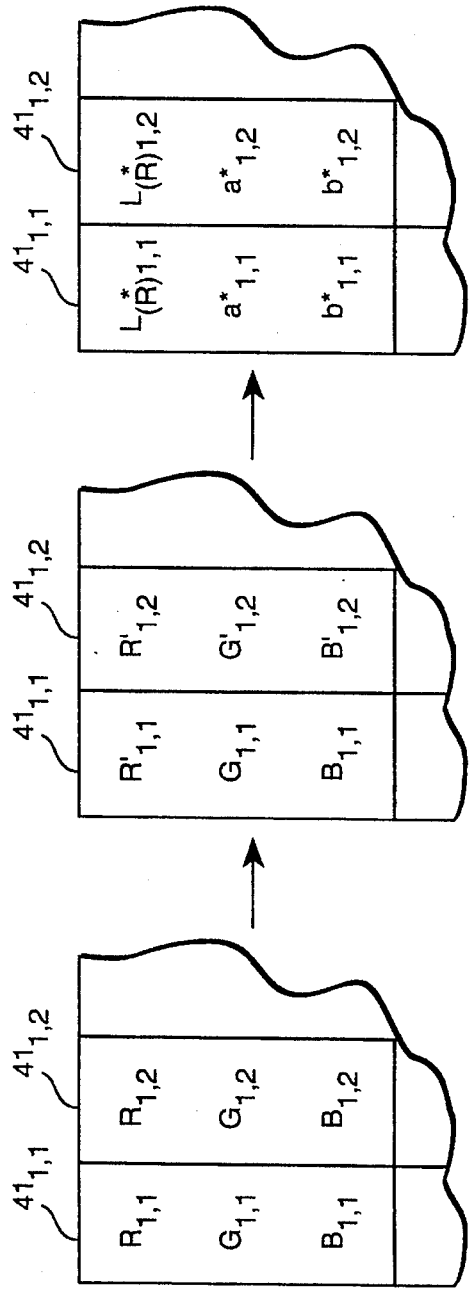
Figure 10D:
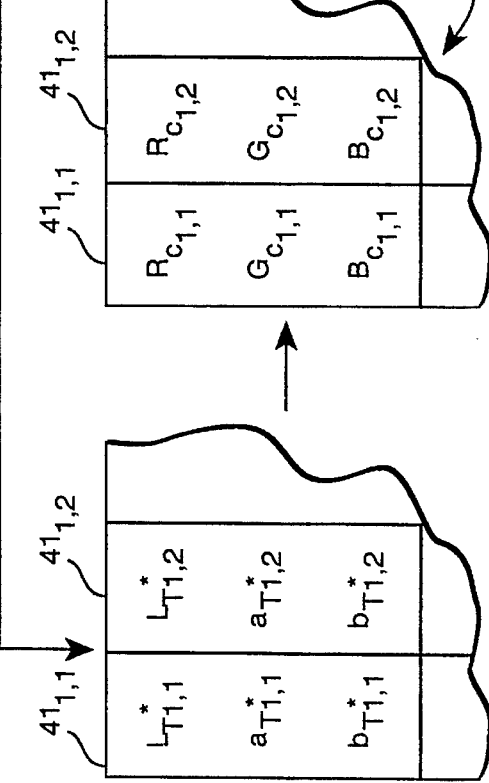

For the selected representation point $P_{s-p}$, at sub-step 230-4, each element of array 40 in image memory 52 is assigned three transformed coordinate values, herein generally represented as $L_T{}^*$, $a_T{}^*$, and $b^*_T$ values (see FIG. 10D). As explained below, the transformation of step 230-4 can occur either in a linear mode or in a non-linear mode, depending on the desired degree of precision and (in some applications) the available information.

In both the linear mode and non-linear mode versions of step 230-4, only the L* values for the nine reduced shades are initially employed. In other words, the a* and b* values shown in FIG. 10C are discarded.

In the linear mode, a range $R_{L*}$ of the nine lightness values is centrally re-justified about the L* coordinate value (i.e., $L_{Ps-p}{}^*$) for a selected one of the shade variation representation points $P_{s-p}$ (recall the elliptical representations points were determined at step 222). That is, as illustrated in FIG. 9, by maintaining the intervals $I_V$, the lightness coordinates for the eight non-central reduction shades are re-calculated with respect to $L_{Ps-p}$. As a result of the re-justification depicted by block 230-1-3, nine P-justified or P-scaled values $L_{-4(Ps-p)}{}^* L_{-3(Ps-p)}{}^*, \ldots L_{-1(Ps-p)}{}^*, L_{Ps-p}{}^*, L_{+1(Ps-p)}{}^*, \ldots L_{+4(ps-p)}{}^*$ are obtained. These nine P-justified values are generically referenced as $L_{n(Ps-p)}$, wherein n=1, ... 9.

Thus, in connection with the linear mode of transformation represented by FIG. 10D, at sub-step 230-4, array $40_p$ has three values assigned to each of its elements. The first value (represented by subscripted values $L_T{}^*$ in FIG. 10D) assigned to an element of array $40_p$ is an appropriate one of the nine P-justified or P-scaled lightness values listed above. The other two values (represented by subscripted values of $a_T{}^*$, $b_T{}^*$ in FIG. 10D) assigned to all elements of array $40_p$ are the a* and b* values of the selected shade variation representation point $P_{s-p}$. These non-lightness coordinate values of the selected shade variation representation point $P_{s-p}$ are represented as $a^*_{Ps-p}$ and $b^*_{Ps-p}$. Thus the a* and b* values are constant for each element of array $40_p$. That is, for all elements in array $40_p$, $a_T{}^*=a^*_{Ps-p}$ and $b_T{}^*=b^*_{Ps-p}$. The lightness correction implemented by this assignment is thus dependent upon the lightness of the character reference swatch $S_{CR}$.

In the non-linear mode of executing sub-step 230-4, nine L* reduced (subscript "R")values $L_{-4(R)}{}^*, L_{-3(R)}{}^*, \ldots L_{-1(R)}{}^*, L_{0(R)}{}^*, L_{+1(R)}{}^*, \ldots L_{+4(R)}{}^*$ from step 230-2 are utilized. As an example of the non-linear mode of execution of sub-step 230-4, consider the central color candidate representation point $P_{s-0}$ illustrated in FIG. 6. The L*, a*, and b* coordinate values of point $P_{s-0}$ are known as a result of execution of step 218 of FIG. 3. In the non-linear mode, those elements of array 40 having a lightness value which is the central lightness value $L_{0(R)}{}^*$ acquire the same a* and b* coordinate values as central color candidate representation point $P_{s-0}$. The elements 41 of array 40 having lightness values other than $L_{0(R)}{}^*$ are assigned other a*, b* values as described below.

In the above regard, in addition to the calculation results obtained from step 218 (see FIG. 3), the image processor 26 has access to the spectral data collected by calculation processing subsystem 24 at step 216. This spectral data, having exemplary values such as shown in FIG. 7, forms a plurality of curves such as illustrated in FIG. 5A and FIG. 5B. One of the curves corresponds to the point $P_{s-0}$ calculated at step 218. In connection with the non-linear mode, the curve corresponding to point $P_{s-0}$ and eight other points/curves are utilized. In particular, taking the curve corresponding to point $P_{s-0}$ as central point, the four most neighborly curves on each side of the curve corresponding to point $P_{s-0}$ are taken as neighboring curves (e.g., four curves below and four curves above).

Figure 11:
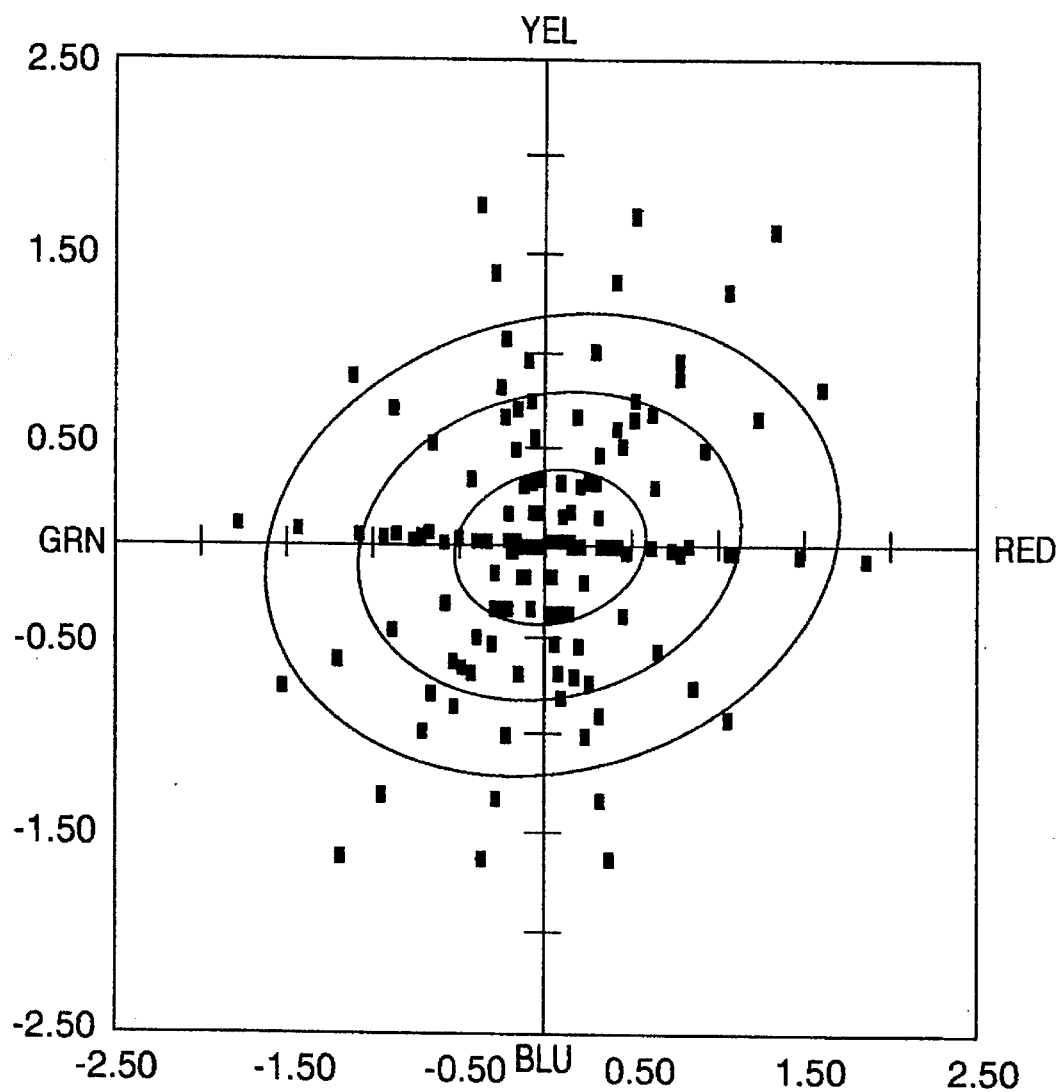
FIG. 11 is a diagrammatic view of output of a prior art color control system which provides a display of expected production variation of a formula against CMC acceptability ellipsoids.
Figure 12:
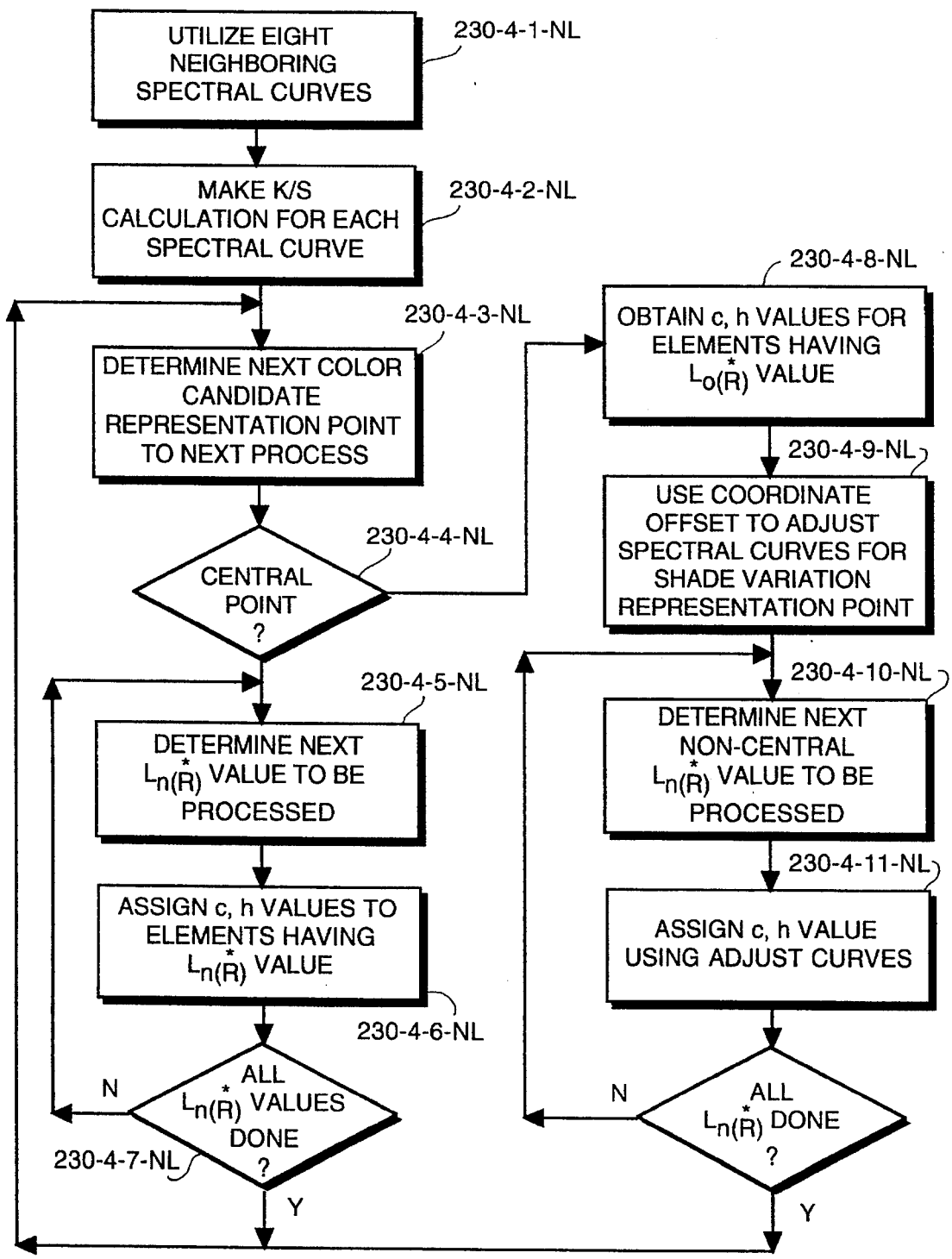
FIG. 12 is a flowchart showing steps included in a non-linear mode of execution of certain steps of swatch simulation generation.

FIG. 11 illustrates further sub-steps involved in the non-linear execution of sub-step 230-4. In particular, at sub-step 230-4-1-NL, the eight neighboring curves are determined as described above. Then, at sub-step 230-4-2-NL, a conventional K/S calculation is made with respect to each of the eight neighboring curves.

At sub-step 230-4-3-NL, image processor 26 determines which of the color candidate representation points is next to be processed. If it is determined at sub-step 230-4-4-NL that the next point is the central point $P_{s-0}$, then sub-steps 230-4-5-NL through 230-4-7-NL are executed. Otherwise, sub-steps 230-4-8-NL through sub-step 230-4-11-NL are executed.

At sub-step 230-4-5-NL, image processor 26 determines which of the eight non-central L* reduced (subscript "R") values needs to have a*, b* values assigned thereto. For example, for a first execution of sub-step 230-4-5-NL elements having the lightness value $L_{-1(R)}{}^*$ may be processed.

The actual assignment of non-L* coordinate values per element occurs at sub-step 230-4-6-NL. At sub-step 230-4-6-NL, image processor 26 determines from the set of nine K/S-converted curves, and the associated L*, a*, and b* values, what a*, b* values should be assigned to array elements having the lightness currently being processed. For example, the a* and b* values of the central point $P_{s-0}$ have been previously calculated (see step 218 in FIG. 3). If the curves do not having exactly corresponding L* values for the $L_{n(Ps-p)}$ being processed, an interpolation can be performed according to standard interpolation techniques.

In connection with the foregoing, it is advantageous to conduct sub-step 230-4-6-NL in terms of an L, c and h (lightness, chroma, and hue) polar coordinate system rather than the L*, a*, b* coordinate system. In this regard, it is well-recognized that L*, a*, and b* values can also be represented in another (polar) coordinate system which has the axes L*, c (chroma) and h (hue). Accordingly, it will be understood that the man skilled in the art can make the necessary conversions to L, c, h coordinates, so that (for the most part) the remainder of the non-linear mode will be described with respect to the L, c, h coordinate system.

After an execution of sub-step 230-4-6-NL, image processor 26 checks at sub-step 230-4-7-NL to determine whether all non-central L* reduced (subscript "R") values $L_{-4(R)}{}^*, L_{-3(R)}{}^*, \ldots L_{-1(R)}{}^*, L_{+1(R)}{}^*, \ldots L_{+4(R)}{}^*$ have been processed. If not, execution loops back to sub-step 230-4-5-NL for acquisition of yet another non-central L* reduced (subscript "R") value. If all elements have been processed, execution returns to sub-step 230-4-3-NL for obtaining yet another color candidate representation point.

As indicated above, when a non-central color candidate representation point is processed, sub-steps 230-4-8-NL through sub-step 230-4-12-NL are executed for a shade variation representation point. Such shade representation points are represented as points $P_{s-p}$, p=1, ... 6 in FIG. 6.

At sub-step 230-4-8-NL, image processor 26 obtains the c and h values for the previously calculated (see step 222 of FIG. 3) shade variation representation point $P_{s-p}$ currently being processed. Further, at sub-step 230-4-8-NL, image processor 26 assigns all elements 41 of array 40 having the central L* reduced (subscript "R") value the c and h values of the shade variation representation point $P_{s-p}$, currently being processed.

At sub-step 230-4-9-NL, the spectral curves previously employed (e.g., at sub-step 23D-4-6-NL) are adjusted using a coordinate offset factor. The coordinate offset factor utilizes a positional differential between the particular shade variation representation point being processed $P_{s-p}$ and the central color candidate representation point $P_{s-0}$.

Figure 13:
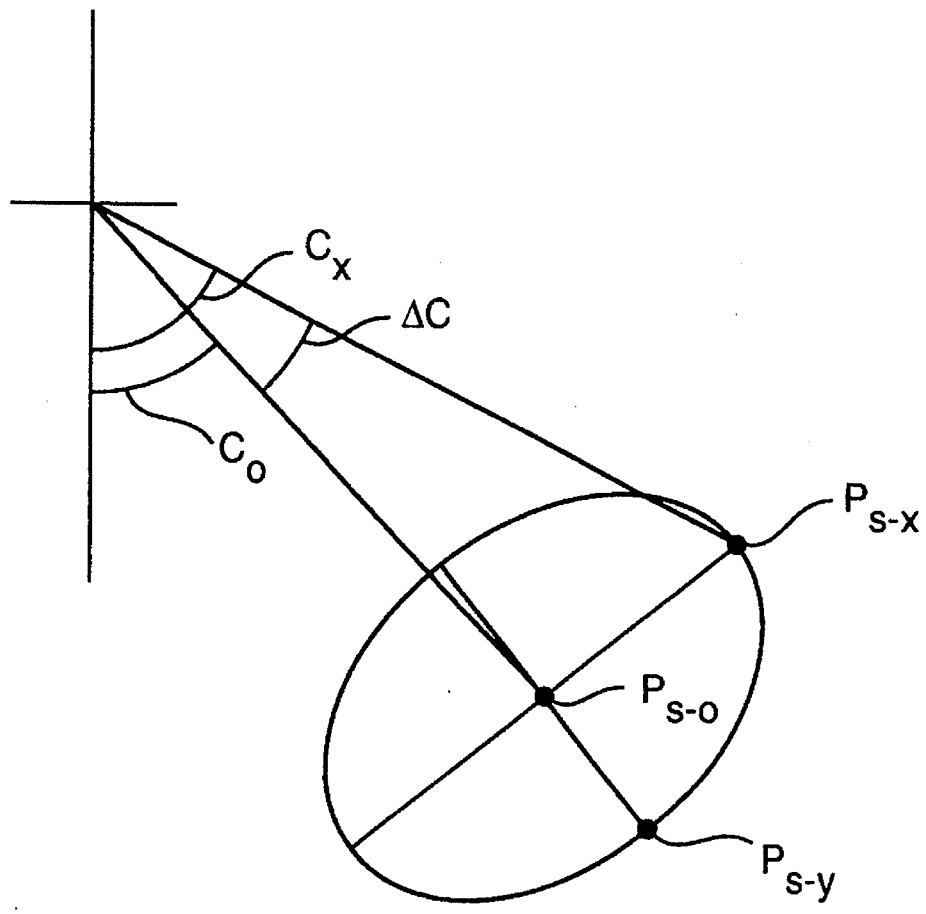
FIG. 13 is a graph illustrating an ellipse in only two dimensions (c, h) in a L-c-h coordinate system.

In the above regard, consider a shade variation representation point $P_{s-x}$ and a central color candidate representation point $P_{s-0}$ as in FIG. 13. FIG. 13 shows an ellipse, such as the ellipse of FIG. 6, but in only two dimensions (c, h) in a L-c-h coordinate system. As illustrated in FIG. 13, shade variation representation point $P_{s-x}$ and central color candidate representation point $P_{s-0}$ have essentially the same lightness and hue, so that the coordinate offset factor is the $\Delta c$. Accordingly, for the "c" data used to generate the eight neighboring curves with respect to shade variation representation point $P_{s-x}$ is adjusted or offset by the "c" coordinate offset factor. For shade variation representation point $P_{s-x}$, $\Delta h$ and $\Delta L$ are zero.

In connection with the adjustment of curves at 230-4-9-NL, it should be understood that a similar coordinate offset factor can be determined and used for other shade variation representation points. For example, for shade variation representation point $P_{s-y}$, a coordinate offset factor $\Delta h$ would be determined and used to adjust the "h" values used for the spectra curves.

At sub-step 230-4-10-L, much like sub-step 230-4-5-NL, image processor 26 determines which of the nine L* reduced (subscript "R") values of array 40 need next be processed. For example, for a first execution of 230-4-10-NL, perhaps the non-central L* reduced (subscript "R") value is processed. For each non-central $L_{n(R)}$*, sub-steps 230-4-11-NL is executed.

At sub-step 230-4-11-NL, image processor 26 makes an actual assignment of c and h values to the elements 41 of array having the $L_{n(R)}$ value being processed (for example, the non-central L* reduced (subscript "R") value $L_{-1(R)}$ is processed for the first execution of sub-step 230-4-11-NL). The assignments of sub-step 230-4-11-NL are similar to those of sub-step 230-4-6-NL, it being understood however that the adjusted spectral curves (adjusted as in sub-step 230-4-9-NL) are utilized.

At sub-step 230-4-12-NL, image processor 26 checks to determine if all non-central L* reduced (subscript "R") value $L_{n(R)}$ have been processed. If not, execution returns to sub-step 230-4-10-NL to obtain yet another non-central L* reduced value. If all lightness values have been processed for the current shade variation representation point, processing returns to sub-step sub-step 230-4-3-NL to obtain another shade variation representation point.

Thus, in the non-linear mode of executing sub-step 230-4 as described above, the $L_{(R)}$* values for the nine reduced shades (see FIG. 10C and sub-step 230-2) are utilized as the $L_T$* values (see FIG. 10D). However, the $a_T$* and $b_T$* values are obtained from spectral data previously generated at step 216 (see FIG. 3), and which is interpolated and adjusted as necessary.

In connection with the non-linear mode of execution of sub-step 230-4, particularly sub-steps 230-4-6-NL and 230-4-11-NL, ordinarily neighboring curves are utilized. For example, if the stage to be simulated is stonewash, it is likely that coordinate values not only from the stonewash spectral data, but also from the rinse and instant old spectral data will be utilized. For extreme wash stages (e.g., bleachout), coordinate values from the new age stage and other extrapolated values will be utilized.

Having just described both the linear and non-linear modes of executing sub-step 230-4, discussion returns to the remaining sub-steps of FIG. 3.

Figure 10E:
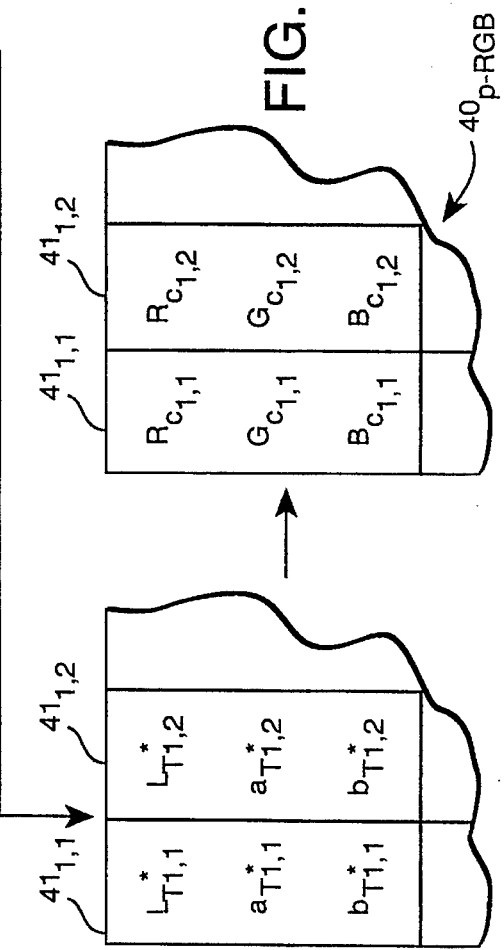

At sub-step 230-5, each display element of desired image simulation array 40 (in color space values) is converted back into R,G,B values, yielding array $40_{p-RGB}$. Such conversion is basically the inverse of the conversion of sub-step 230-2. Conversion values $R_C, G_C, B_C$ are illustrated in FIG. 10E.

At sub-step 230-6, the array $40_{p-RGB}$ is visibly reproduced as simulated swatch $SS_{s-p}$ using either or both of printer 72 or display screen 64. Array $40_{p-RGB}$ is replicated on display screen 64 (using display driver 62) and on (e.g., paper) hardcopy (by printer 72) in conventional manner.

Upon replication of a simulated swatch, at step 230-8 the image processing subsystem 26 determines if simulation swatches have been generated for all seven representation points. If simulation swatches have yet to be generated for other representation points, the next representation point is selected at step 230-8. For example, after representation point $P_{s-0}$ has been processed, representation point $P_{s-1}$ might next be processed, followed by point $P_{s-2}$, and so forth.

Hence, sub-steps 230-4 through 230-8 constitute a loop, most of which is executed for each representation point in connection with the generation of an associated simulated swatch $SS_{s-p}$, p=0, 1, ... 6. After all representation points have been thusly processed as determined at sub-step 230-7, generation step 230 is terminated (as indicated by sub-step 230-9).

Upon completion of step 230, image processing subsystem 26 determines if simulated swatches are needed for another stage (step 232). If so, execution returns to step 228 for a determination of what stage should next be processed. Thus, it should be understood from the foregoing that a set (e.g., seven) of simulated swatches can be generated for one or more, or even all, washing stages. When all swatch generation is complete, the process of FIG. 3 terminates (step 234).

It should also be understood that the procedure described above can be further automated to provide, for example, for the subsequent scanning of other character reference swatches.

Thus, upon completion of step 230, the operator is provided prior to manufacture—with a set of simulated swatches $SS_{s-p}$ which visibly depict acceptable boundary shades for the target denim product.

Using the central simulated swatch $SS_{s-0}$ and the boundary shade simulated swatches $SS_{s-p}$, p=1, ... 6, a customer can make an accurate determination of shade acceptability even before manufacture. Similarly, quality control person can have a more comprehensive frame of reference in which to determine if production material satisfies the expectation of the customer.

Whereas the foregoing discussion concerns the generation of a colored target material using judiciously selected color candidate representation points, it should be understood that the invention can also generate simulations based on other criteria. For example, as shown in FIG. 3B, in an alternate embodiment, formula performance data gleaned from a color formula analysis system (such as that marketed by SheLyn, Incorporated) can instead be input at step 322 to image processing subsystem 26 as formula performance representation points. The formula performance data includes data represented by the display of FIG. 11. That is, in order to generate a set of swatches at step 330, a plurality of representation points in color space are input at step 322 based on the data set that produced the output shown in FIG. 11. For example, the representation points input at step 322 might include the lightest and darkest points from the output data set of FIG. 11 as well as points having the extreme-most readings along the a* and b* axes (in both the negative and positive sense). Thus, a total of six representation points would be selected, such that a set of six formula performance simulated swatches would be produced at step 330.

In connection with the steps executed in FIG. 3, it should be understood that execution of steps 324, 326, 328, and 334 is understood from the previous description of the execution of steps 224, 226, 228, and 234, respectively. Sub-steps encompassed within step 330 are similar to those illustrated (in FIG. 8) for step 230.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A method for simulating a colored target material, the method comprising:

selecting a point in color space, the selected point having both a lightness coordinate value and non-lightness coordinate values;

obtaining a character reference pattern having at least one desired character property of the target material, the character reference pattern being stored as an array, a plurality of elements of the array being assigned a corresponding initial lightness value;

using the lightness coordinate value of the selected point to form adjusted lightness values for the elements of the array;

transforming the array by assigning the non-lightness coordinate values of the selected point to each element of the array whereby, together with the adjusted lightness values, the elements of the transformed array are representable in color space; and using the transformed array to provide a visual output representative of the target material.

2. The method of claim 1, wherein the selected point has a lightness coordinate L* in CIE color space and non-lightness coordinate values a*, b* in CIE color space.

3. The method of claim 1, wherein using the transformed array to provide a visual output comprises printing the transformed array to provide a simulation of the colored target material.

4. The method of claim 1, wherein using the transformed array to provide a visual output comprises driving a screen display to provide a simulation of the colored target material.

5. The method of claim 1, wherein the step of obtaining the character reference pattern comprises analyzing a character reference material by mapping the character reference material into the array and, based on character properties of the character reference material, assigning at least initial lightness values to the elements of the array.

6. The method of claim 1, wherein the step of obtaining the character reference pattern comprises selecting a desired character reference pattern from a plurality of character reference patterns stored in a memory.

7. The method of claim 1, wherein the step of using the lightness coordinate value of the selected point to form adjusted lightness values for the elements of the array comprises:

determining a range of the initial lightness values of the array, determining a reference initial lightness value of the array, and determining intervals between the reference initial lightness value and non-reference initial lightness values;

substituting the lightness coordinate value of the selected point for the reference initial lightness value of the array to form an adjusted reference lightness value;

using the adjusted reference lightness value and the intervals to determine the adjusted non-reference lightness values.

8. The method of claim 1, wherein the point in space is selected from a set of points representing potential shade variations of a dye formula for the target material.

9. The method of claim 8, wherein each point in the set of points has an L* coordinate value, an a* coordinate value, and a b* coordinate value, and wherein the selected point is one of the following points:

the point in the set with the lightest coordinate value of potential shade variation of the dye formula;

the point in the set with the darkest coordinate value of potential shade variation of the dye formula;

the point in the set with the greatest a* coordinate value;

the point in the set with the least a* coordinate value;

the point in the set with the greatest b* coordinate value;

the point in the set with the least b* coordinate value.

10. A method for simulating a colored material, the method comprising:

obtaining a character reference pattern having at least one desired character property of the material-to-be-simulated, the character reference pattern being stored as an array, a plurality of elements of the array having at least a corresponding lightness coordinate value;

for a selected element of the array, using the lightness coordinate value of the selected element to determine transformation non-lightness coordinate values to be assigned to the selected element, the transformation non-lightness coordinate values to be assigned to the selected element being determined by referencing a predefined set of points in color space, the determination utilizing, as the transformation non-lightness coordinate values for the selected element, non-lightness coordinate values of a matched one the points in the set, the matched point in the set having a lightness coordinate value which fulfills a predetermined criteria with respect to the lightness coordinate value of the selected element;

transforming the array by assigning the non-lightness coordinate values of the matched point to the selected element of the array whereby, together with the lightness coordinate values of the selected element of the array, the selected element of the transformed array is representable in color space; and using the array with the transformation non-lightness coordinate values for the selected element to provide a visual output representative of the material-to-be-simulated.

11. The method of claim 10, wherein the predetermined criteria is closest numerical proximity to the lightness coordinate value of the selected element.

12. The method of claim 10, wherein the predefined set of points in color space is obtained by conducting spectral analysis for material subjected to at least one stage of a color-affecting process.

13. The method of claim 12, wherein the material is fabric, and wherein the predefined set of points in color space is obtained by conducting spectral analysis for fabric subjected to at least one stage of a washing process.

14. The method of claim 13, wherein the fabric is denim.

15. A method for simulating a range of shade variations for a colored target material, the method comprising:

selecting a point in color space corresponding to a desired constituent color of the colored target material;

determining a three dimensional volume of acceptable color variation about the target point;

selecting a plurality of shade variation representation points in color space on a surface of the three dimensional volume, thereby forming a set of color candidate representation points comprising the selected point and the shade variation representation points;

generating a visually-perceptible simulation for a plurality of representation points, thereby forming a set of visually-perceptible simulations depicting a range of predetermined shade variation.

16. The method of claim 15, wherein the three dimensional volume is a three dimensional ellipse.

17. The method of claim 15, wherein the color space has L*, a*, and b* axes, and wherein the shade variation representation points lie at intersections of the three dimensional volume with a secondary axis of color space, the secondary axis being parallel to one of the L*, a*, b* and axes in CIE color space.

18. The method of claim 15, wherein the point has both a lightness coordinate value and non-lightness coordinate values, further including obtaining a character reference pattern having at least one desired character property of the target material, the character reference pattern being stored as an array, a plurality of elements of the array being assigned a corresponding initial lightness value;

and wherein, to form the set of visually-perceptible simulations depicting a range of predetermined shade variation, the following steps are performed for the color candidate representation points:
(a) using the lightness coordinate value of the color candidate representation point to form adjusted lightness values for the elements of the array;
(b) transforming the array by assigning the non-lightness coordinate values of the color candidate representation point to the elements of the array whereby, together with the adjusted lightness values the non-lightness coordinate values of the representation point, the elements of the transformed array are representable in color space; and
(c) using the transformed array to provide a visually-perceptible simulation of a corresponding color shade variation of the target material.

19. The method of claim 15, wherein the target point has both a lightness coordinate value and non-lightness coordinate values, the selected point belonging to a predefined set of points, the method further including:

obtaining a character reference pattern having at least one desired character property of the target material, the character reference pattern being stored as an array, a plurality of elements of the array being assigned a corresponding initial lightness value;

and wherein, to form the set of visually-perceptible simulations depicting a range of predetermined shade variation, the following steps are performed for the representation points:
(a) for a selected element of the array, using the lightness coordinate value of the selected element to determine transformation non-lightness coordinate values to be assigned to the selected element, the transformation non-lightness coordinate values to be assigned to the selected element being determined by referencing the predefined set of points in color space, the determination utilizing, as the transformation non-lightness coordinate values for the selected element, non-lightness coordinate values of a matched one the points in the set, the matched point in the set having a lightness coordinate value which fulfills a predetermined criteria with respect to the lightness coordinate value of the selected element;
(b) transforming the array by assigning the non-lightness coordinate values of the representation point to the selected element of the array whereby, together with the lightness coordinate values of the selected element of the array, the selected element of the transformed array is representable in color space; and
(c) using the array with the transformation non-lightness coordinate values for the selected element to provide the visually-perceptible simulation representative of the target material.

20. The method of claim 19, wherein the predetermined criteria is closest numerical proximity to the lightness coordinate value of the selected element.

21. The method of claim 19, wherein the predefined set of points in color space is obtained by conducting spectral analysis for material subjected to at least one stage of a color-affecting process.

22. The method of claim 21, wherein the material is fabric, and wherein the predefined set of points in color space is obtained by conducting spectral analysis for fabric subjected to at least one stage of a washing process.

23. The method of claim 22, wherein the fabric is denim.

24. A method for simulating a colored target material expected to result from at least one color-affecting treatment, the target material being composed of a first constituent element and a second constituent element, the method comprising:

(a) obtaining spectral data from a colored reference material, the colored reference material being composed of the first constituent element and the second constituent element;

(b) obtaining spectral data from a first test material, the first test material being composed only of the first constituent element;

(c) obtaining spectral data from a second test material, the second test material being composed of the first constituent element and the second constituent element, the first constituent element of the second test material being the same as that of the first test material;

(d) subjecting the color reference material, the first test material, and the second test material to at least one color-affecting treatment;

(e) obtaining spectral data from each of the color reference material, the first test material, and the second test material after the at least one color-affecting treatment;

(f) using the spectral data from steps (a)–(c) and (e) to determine a selected point in color space which corresponds to the color for the first constituent element, after the at least one color-affecting treatment.

25. The method of claim 24, wherein the target material is a textile, and wherein the first constituent element is warp yarn and the second constituent element is fill yarn.

26. The method of claim 24, wherein a plurality of color reference materials, a plurality of first test materials, and a plurality of second test materials are utilized.

27. The method of claim 24, wherein a plurality of color-affecting treatments are preformed, and wherein step (e) is performed after each color-affecting treatment.

28. The method of claim 27, wherein the target material is denim, wherein the first constituent element is warp yarn and the second constituent element is fill yarn, and wherein the color-affecting treatments are sequential washing processes.

29. The method of claim 27, wherein the selected point has both a lightness coordinate value and non-lightness coordinate values, and wherein the target material is simulated by executing the following steps:

obtaining a character reference pattern having at least one desired character property of the target material, the character reference pattern being stored as an array, a plurality of elements of the array being assigned a corresponding initial lightness value;

using the lightness coordinate value of the selected point to form adjusted lightness values for the elements of the array;

transforming the array by assigning the non-lightness coordinate values of the selected point to the elements of the array whereby, together with the adjusted lightness values and the non-lightness coordinate values of the selected point, the elements of the transformed array are representable in color space; and using the transformed array to provide a visual output representative of the color of the target material.

30. The method of claim 29, wherein the step of obtaining the character reference pattern comprises analyzing a character reference material by mapping the character reference material into an array and, based on character properties of the character reference material, assigning at least initial lightness values to the elements of the array.

31. The method of claim 29, wherein the step of obtaining the character reference pattern comprises selecting a desired character reference pattern from a plurality of character reference patterns stored in a memory.

32. The method of claim 29, wherein the step of using the lightness coordinate value of the selected point to form adjusted lightness values for the elements of the array comprises:

determining a range of the initial lightness values of the array, determining a reference initial lightness value of the array, and determining intervals between the reference initial lightness value and non-reference initial lightness values;

substituting the lightness coordinate value of the selected point for the reference initial lightness value of the array to form an adjusted reference lightness value;

using the adjusted reference lightness value and the intervals to determine adjusted non-reference lightness values.

33. The method of claim 27, wherein the selected point has both a lightness coordinate value and non-lightness coordinate values, the selected point belonging to a predefined set of points, the method further including:

obtaining a character reference pattern having at least one desired character property of the target material, the character reference pattern being stored as an array, a plurality of elements of the array being assigned a corresponding initial lightness value;

and wherein, to form the set of simulation outputs depicting a range of predetermined shade variation, the following steps are performed for the representation points:

(a) for a selected element of the array, using the lightness coordinate value of the selected element to determine transformation non-lightness coordinate values to be assigned to the selected element, the transformation non-lightness coordinate values to be assigned to the selected element being determined by referencing the predefined set of points in color space, the determination utilizing, as the transformation non-lightness coordinate values for the selected element, non-lightness coordinate values of a matched one the points in the set, the matched point in the set having a lightness coordinate value which fulfills a predetermined criteria with respect to the lightness coordinate value of the selected element (b) transforming the array by assigning the non-lightness coordinate values of the selected point to the selected element of the array whereby, together with the lightness coordinate values: of the selected element of the array, the selected element of the transformed array is representable in color space; and (c) using the array with the transformation non-lightness coordinate values for the selected element to provide a visual output representative of the target material.

34. The method of claim 27, wherein the predetermined criteria is closest numerical proximity to the lightness coordinate value of the selected element.

35. The method of claim 27, wherein the predefined set of points in color space is obtained by conducting spectral analysis for material subjected to at least one stage: of a color-affecting process.

36. Apparatus for simulating a colored target material, the apparatus comprising:

a memory wherein is stored a character reference pattern having at least one desired character property of the target material, the character reference pattern being stored in the memory as an array, a plurality of elements of the array being assigned a corresponding initial lightness value;

an image processor which uses a lightness coordinate value of a selected point in color space to form adjusted lightness values for each of the elements of the array, the selected point having both the lightness coordinate value and non-lightness coordinate values, the image processor further transforming the array by assigning the non-lightness coordinate values of the selected point to the elements of the array whereby, together with the adjusted lightness values the non-lightness coordinate values of the selected point, the elements of the transformed array are representable in color space; and an output device which uses the transformed array to provide a visual output representative of the target material.

37. The apparatus of claim 36, wherein the selected point has a lightness coordinate L* in CIE color space and non-lightness coordinate values a*, b* in CIE color space.

38. The apparatus of claim 36, wherein the output device is a printer.

39. The apparatus of claim 36, wherein using the output device is a display screen.

40. The apparatus of claim 36, further comprising a scanner which analyzes a character reference material by mapping the character reference material into an array and, based on character properties of the character reference material, assigns at least initial lightness values to the elements of the array.

41. Apparatus for simulating a colored target material, the apparatus comprising:

a first memory wherein is stored a character reference pattern having at least one desired character property of the target material, the character reference pattern being stored in the memory as an array, each of a plurality of elements of the array being assigned a corresponding initial lightness value;

a second memory wherein is stored a predefined set of points in color space, each point in the set having a lightness coordinate value and non-lightness coordinate values;

an image processor which uses, for a selected element of the array, the lightness coordinate value of the selected element to determine transformation non-lightness coordinate values to be assigned to the selected element, the transformation non-lightness coordinate values to be assigned to the selected element being determined by referencing the predefined set of points in color space, the determination utilizing, as the transformation non-lightness coordinate values for the selected element, non-lightness coordinate values of a selected one the points in the set, the selected point in the set having a lightness coordinate value which fulfills a predetermined criteria with respect to the lightness coordinate value of the selected element, the image processor further transforming the array by assigning the non-lightness coordinate values of the selected point to the selected element of the array whereby, together with the lightness coordinate values of the selected element of the array, the selected element of the transformed array is representable in color space; and an output device which uses the transformed array to provide a visual output representative of the target material.

42. The apparatus of claim 41, wherein the output device is a printer.

43. The apparatus of claim 41, wherein using the output device is a display screen.

44. The apparatus of claim 41, further comprising a scanner which analyzes a character reference material by mapping the character reference material into an array and, based on character properties of the character reference material, assigns at least initial lightness values to each of a plurality of elements of the array.

45. Apparatus for simulating a colored target material, the apparatus comprising:

a memory for storing therein a set of points in color space, each point having a lightness coordinate value and non-lightness coordinate values;

a processor which determines a selected point in color space corresponding to a desired color of the colored target material an input device for inputting criteria for developing a three dimensional volume of acceptable color variation about the selected point;

and wherein the processor uses the inputted criteria to further select a plurality of shade variation representation points in color space, the shade variation representation points being on a surface of the three dimensional volume, thereby forming a set of representation points comprising the selected point and the plurality of shade variation representation points; and an output device for generating a simulation output for a plurality of representation points, thereby forming a set of simulation outputs depicting a range of predetermined shade variation.

46. The apparatus of claim 45, wherein the output device is a printer.

47. The apparatus of claim 45, wherein using the output device is a display screen.

48. Apparatus for use with a color-affecting material treatment processor for simulating a colored target material expected to result from at least one color-affecting treatment, the target material being composed of a first constituent element and a second constituent element, the apparatus comprising:

a spectral analyzer for obtaining spectral data from material including:
(a) a colored reference material, the colored reference material being composed of the first constituent element and the second constituent element;
(b) a first test material, the first test material being composed only of the first constituent element;
(c) a second test material, the second test material being composed of the first constituent element as the first test material and the second constituent element, the first constituent element of the second test material being the same as that of the first test material;
(d) the colored reference material after undergoing the color-affecting treatment, the first test material after undergoing the color-affecting treatment, and the second test material after undergoing the color-affecting treatment;

a processor which uses the spectral data for materials (a) - (d) to determine a selected point in color space which corresponds to the suitable pre-processing color for the first constituent element in order to achieve a desired appearance of the target material after the at least one color-affecting treatment.

49. The apparatus of claim 48, wherein the target material is a textile, and wherein the first constituent element is warp yarn and the second constituent element is fill yarn.

50. The apparatus of claim 48, wherein a plurality of color reference materials, a plurality of first test materials, and a plurality of second test materials are utilized.

51. The apparatus of claim 48, wherein the color-affecting treatment processor performs a plurality of color-affecting processes.

52. The apparatus of claim 51, wherein the target material is denim, wherein the first constituent element is warp yarn and the second constituent element is fill yarn, and wherein the color-affecting treatment processor performs sequential washing processes.

53. The apparatus of claim 51, wherein the selected point has both a lightness coordinate value and non-lightness coordinate values, and further comprising:

a memory for storing a character reference pattern having at least one desired character property of the target material, the character reference pattern being stored as an array, a plurality of elements of the array being assigned a corresponding initial lightness value;

wherein the processor uses the lightness coordinate value of the selected point to form adjusted lightness values for the elements of the array and transforms the array by assigning the non-lightness coordinate values of the selected point to the elements of the array whereby, together with the adjusted lightness values and the non-lightness coordinate values of the selected point, the elements of the transformed array are representable in color space; and wherein the output devices uses the transformed array to provide a visual output representative of the color of the target material.

54. The apparatus of claim 53, further comprising a scanner for obtaining the character reference pattern.

55. The apparatus of claim 53, further comprising a pattern library having stored therein a plurality of character reference patterns.

56. The method of claim 24, wherein the colored reference material is obtained by:

obtaining spectral data from a plurality of swatches;

averaging the spectral data for the plurality of swatches to determine average spectral data; and selecting as the colored reference material a swatch of the plurality of swatches which most closely corresponds to the averaged spectral data.

57. The method of claim 48, wherein the spectral analyzer obtains spectral data from a plurality of swatches; wherein the processor averages the spectral data for the plurality of swatches to determine average spectral data and selects as the colored reference material a swatch of the plurality of swatches which most closely corresponds to the averaged spectral data.

58. A method for simulating a colored target material expected to result from at least one color-affecting treatment, the target material being composed of a first constituent element and a second constituent element, the method comprising:

(a) obtaining spectral data from a plurality of test materials, including a first test material and a second test material, the first test material being composed only of the first constituent element, the second test material being composed of the first constituent element and the second constituent element, the first constituent element of the second test material being the same as that of the first test material;

(b) subjecting the color reference material, the first test material, and the second test material to at least one color-affecting treatment;

(c) obtaining spectral data from the first test material and the second test material after the at least one color-affecting treatment;

(d) using the spectral data from steps (a) and (c) to determine a selected point in color space which corresponds to the color for the first constituent element, after the at least one color-affecting treatment.

59. The method of claim 58, wherein the target material is a textile, and wherein the first constituent element is warp yarn and the second constituent element is fill yarn.

60. The method of claim 58, wherein a plurality of color reference materials, a plurality of first test materials, and a plurality of second test materials are utilized.

61. The method of claim 58, wherein the target material is denim, wherein the first constituent element is warp yarn and the second constituent element is fill yarn, and wherein the color-affecting treatments are sequential washing processes.

62. The method of claim 58, wherein the selected point has both a lightness coordinate value and non-lightness coordinate values, and wherein the target material is simulated by executing the following steps:

obtaining a character reference pattern having at least one desired character property of the target material, the character reference pattern being stored as an array, a plurality of elements of the array being assigned a corresponding initial lightness value;

using the lightness coordinate value of the selected point to form adjusted lightness values for the elements of the array;

transforming the array by assigning the non-lightness coordinate values of the selected point to elements of the array whereby, together with the adjusted lightness values and the non-lightness coordinate values of the selected point, the elements of the transformed array are representable in color space; and using the transformed array to provide a visual output representative of the color of the target material.

63. The method of claim 62, wherein the step of obtaining the character reference pattern comprises analyzing a character reference material by mapping the character reference material into an array and, based on character properties of the character reference material, assigning at least initial lightness values to the elements of the array.

64. The method of claim 62, wherein the step of obtaining the character reference pattern comprises selecting a desired character reference pattern from a plurality of character reference patterns stored in a memory.

65. The method of claim 62, wherein the step of using the lightness coordinate value of the selected point to form adjusted lightness values for the elements of the array comprises:

determining a range of the initial lightness values of the array, determining a reference initial lightness value of the array, and determining intervals between the reference initial lightness value and non-reference initial lightness values;

substituting the lightness coordinate value of the selected point for the reference initial lightness value of the array to form an adjusted reference lightness value;

using the adjusted reference lightness value and the intervals to determine adjusted non-reference lightness values.

66. The method of claim 58, wherein the selected point has both a lightness coordinate value and non-lightness coordinate values, the selected point belonging to a predefined set of points, the method further including:

obtaining a character reference pattern having at least one desired character property of the target material, the character reference pattern being stored as an array, a plurality of elements of the array being assigned a corresponding initial lightness value;

and wherein, to form the set of simulation outputs depicting a range of predetermined shade variation, the following steps are performed for the representation points:

(a) for a selected element of the array, using the lightness coordinate value of the selected element to determine transformation non-lightness coordinate values to be assigned to the selected element, the transformation non-lightness coordinate values to be assigned to the selected element being determined by referencing the predefined set of points in color space, the determination utilizing, as the transformation non-lightness coordinate values for the selected element, non-lightness coordinate values of a matched one the points in the set, the matched point in the set having a lightness coordinate value which fulfills a predetermined criteria with respect to the lightness coordinate value of the selected element;

(b) transforming the array by assigning the non-lightness coordinate values of the selected point to the selected element of the array whereby, together with the lightness coordinate values of the selected element of the array, the selected element of the transformed array is representable in color space; and (c) using the array with the transformation non-lightness coordinate values for the selected element to provide a visual output representative of the target material.

67. The method of claim 58, wherein the predetermined criteria is closest numerical proximity to the lightness coordinate value of the selected element.

68. Apparatus for use with a color-affecting material treatment processor for simulating a colored target material expected to result from at least one color-affecting treatment, the target material being composed of a first constituent element and a second constituent element, the apparatus comprising:

a spectral analyzer for obtaining spectral data from:
(a) a plurality of test materials including a first test material and a second test material, the first test material being composed only of the first constituent element, the second test material being composed of the first constituent element as the first test material and the second constituent element, the first constituent element of the second test material being the same as that of the first test material;
(b) the first test material after undergoing the color-affecting treatment, and the second test material after undergoing the color-affecting treatment;

a processor which uses the spectral data for materials (a)–(b) to determine a selected point in color space which corresponds to the suitable pre-processing color for the first constituent element in order to achieve a desired appearance of the target material after the at least one color-affecting treatment.

69. The apparatus of claim 68, wherein the target material is a textile, and wherein the first constituent element is warp yarn and the second constituent element is fill yarn.

70. The apparatus of claim 68, wherein a plurality of color reference materials, a plurality of first test materials, and a plurality of second test materials are utilized.

71. The apparatus of claim 68, wherein the color-affecting treatment processor performs a plurality of color-affecting processes.

72. The apparatus of claim 71, wherein the target material is denim, wherein the first constituent element is warp yarn and the second constituent element is fill yarn, and wherein the color-affecting treatment processor performs sequential washing processes.

73. The apparatus of claim 71, wherein the selected point has both a lightness coordinate value and non-lightness coordinate values, and further comprising:

a memory for storing a character reference pattern having at least one desired character property of the target material, the character reference pattern being stored as an array, a plurality of elements of the array being assigned a corresponding initial lightness value;

wherein the processor uses the lightness coordinate value of the selected point to form adjusted lightness values for the elements of the array and transforms the array by assigning the non-lightness coordinate values of the selected point to the elements of the array whereby, together with the adjusted lightness values and the non-lightness coordinate values of the selected point, the elements of the transformed array are representable in color space; and wherein the output devices uses the transformed array to provide a visual output representative of the color of the target material.

74. The apparatus of claim 73, further comprising a scanner for obtaining the character reference pattern.

75. The apparatus of claim 73, further comprising a pattern library having stored therein a plurality of character reference patterns.

76. A method for simulating a colored target material, the method comprising:

selecting a point in color space and generating signals therefor, including a lightness coordinate value signal of the selected point and non-lightness coordinate value signals of the selected point;

obtaining signals for a character reference pattern, the character reference pattern having at least one desired character property of the target material, the character reference pattern comprising an array of elements, wherein a corresponding initial lightness signal is obtained for the plurality of elements of the array;

using a processor to generate simulation signals which simulate the colored target material by:
using the lightness coordinate value signal of the selected point to obtain adjusted lightness signals for the elements of the array;
using the non-lightness coordinate value signals of the selected point as non-lightness coordinate value signals for the elements of the array; and driving an output device with the simulation signals to obtain a visually-perceptible image of the colored target material.

77. A method for simulating a colored material, the method comprising:

obtaining signals for a character reference pattern, the character reference pattern having at least one desired character property of the material-to-be-simulated, the character reference pattern comprising an array of elements, wherein a corresponding lightness signal is obtained for the plurality of elements of the array;

for a selected element of the array, using the lightness signal of the selected element to determine transformation non-lightness signals to be assigned to the selected element, the transformation non-lightness signals assigned to the selected element being determined by referencing signals corresponding to a predefined set of points in color space, the determination utilizing, as the transformation non-lightness signals for the selected element, non-lightness signals of a matched one the points in the set, the matched point in the set having a lightness coordinate signal which fulfills a predetermined criteria with respect to the lightness signal of the selected element;

assigning the non-lightness signals of the matched point to the selected element of the array whereby, together with the lightness coordinate signals of the selected element of the array, the selected element of the transformed array is representable in color space by transformed element signals; and using the transformed element signals to drive an output device and thereby provide a visual output representative of the material-to-be-simulated.

78. A method for simulating a range of shade variations for a colored target material, the method comprising:
   (1) inputting into a processor signals indicative of a selected point in color space, the selected point corresponding to a desired constituent color of the colored target material;
   (2) inputting into the processor signals indicative of a three dimensional volume of acceptable color variation about the target point;
   (3) using a processor to generate, from the signals input in steps (1) and (2), signals for a plurality of shade variation representation points in color space on a surface of the three dimensional volume, thereby generating a set of signals for a corresponding set of color candidate representation points comprising the selected point and the shade variation representation points;
   (4) using the set of signals generated at step (3) to drive an output device and thereby provide a corresponding set of a visually-perceptible simulation outputs for each representation point, and thereby depicting a range of predetermined shade variation.

* * * * *